US012162220B2

(12) United States Patent
Crabtree et al.

(10) Patent No.: US 12,162,220 B2
(45) Date of Patent: Dec. 10, 2024

(54) METHOD OF SMOOTHING A SURFACE OF AN ADDITIVELY MANUFACTURED PART

(71) Applicant: Additive Manufacturing Technologies Limited, Sheffield (GB)

(72) Inventors: Joseph Gwilliam Crabtree, Sheffield (GB); Konstantin Rybalcenko, Sheffield (GB); Andre Gaio, Sheffield (GB)

(73) Assignee: ADDITIVE MANUFACTURING TECHNOLOGIES LIMITED, Sheffield (GB)

( * ) Notice: Subject to any disclaimer, the term of this patent is extended or adjusted under 35 U.S.C. 154(b) by 0 days.

(21) Appl. No.: 17/895,381

(22) Filed: Aug. 25, 2022

(65) Prior Publication Data
US 2023/0091181 A1    Mar. 23, 2023

Related U.S. Application Data

(63) Continuation of application No. 16/476,511, filed as application No. PCT/GB2017/053841 on Dec. 20, 2017, now abandoned.

(30) Foreign Application Priority Data

Jan. 9, 2017  (GB) ..................... 1700346

(51) Int. Cl.
*B29C 64/35* (2017.01)
*B08B 3/10* (2006.01)
(Continued)

(52) U.S. Cl.
CPC .............. *B29C 64/35* (2017.08); *B08B 3/106* (2013.01); *B29C 71/0009* (2013.01); *B33Y 40/20* (2020.01)

(58) Field of Classification Search
CPC .......................... B29C 71/0009; B29C 64/35
(Continued)

(56) References Cited

U.S. PATENT DOCUMENTS 1,185,461 A * 5/1916 Ellis ................. H02K 17/14
                                                    310/212
1,185,641 A * 6/1916 Ellis ................. C11D 11/0047
                                                    510/202
(Continued)

FOREIGN PATENT DOCUMENTS

CN       20341380 U      1/2014
CN       104339646 A     2/2015
(Continued)

OTHER PUBLICATIONS

C. Goldsmith Aug. 12, 2020 Chemistry Score—Solvents (https://chemstryscore.com/protic-vs-aprotic-solvents/ (Year: 2020).*
(Continued)

*Primary Examiner* — Matthew J Daniels
*Assistant Examiner* — Wayne K. Swier
(74) *Attorney, Agent, or Firm* — Alston & Bird LLP

(57) ABSTRACT

The present invention provides apparatus for post-processing an additively manufactured polymer part, comprising a reservoir (402) for containing a liquid solvent; a processing chamber (408) in controllable fluid communication with the reservoir, and a controller (418) configured to controllably post-process an additively manufactured polymer part located in the processing chamber by the solvent responsive to at least one parameter associated with the part. A method for post-processing an additively manufactured polymer part is also provided.

19 Claims, 18 Drawing Sheets

(51) Int. Cl.
 B29C 71/00 (2006.01)
 B33Y 40/20 (2020.01)
(58) Field of Classification Search
 USPC .......................................................... 134/186
 See application file for complete search history.

(56) References Cited

U.S. PATENT DOCUMENTS

| | | | |
|---|---|---|---|
| 3,684,553 A * | 8/1972 | Van Dyk | B05D 3/107 |
| | | | 216/75 |
| 4,302,418 A | 11/1981 | Cullis et al. | |
| 4,857,694 A | 8/1989 | Doyle et al. | |
| 5,180,438 A | 1/1993 | Hockh et al. | |
| 5,248,456 A | 9/1993 | Evans, Jr. et al. | |
| 5,448,838 A | 9/1995 | Edmonds | |
| 5,538,025 A | 7/1996 | Gray et al. | |
| 6,004,403 A | 12/1999 | Gray et al. | |
| 6,086,797 A | 7/2000 | Bango, Jr. | |
| 6,227,214 B1 * | 5/2001 | Mansur | B08B 15/00 |
| | | | 134/107 |
| 7,125,512 B2 | 10/2006 | Crump et al. | |
| 7,236,166 B2 | 6/2007 | Zinniel et al. | |
| 7,444,761 B2 | 11/2008 | Gray | |
| 8,765,045 B2 | 7/2014 | Zinniel | |
| 2003/0072875 A1 | 4/2003 | Sandhu | |
| 2003/0226576 A1 | 12/2003 | Gray et al. | |
| 2005/0173838 A1 | 8/2005 | Priedeman | |
| 2005/0208271 A1 | 9/2005 | Fasching et al. | |
| 2007/0204480 A1 | 9/2007 | Gray | |
| 2008/0169585 A1 | 7/2008 | Zinniel | |
| 2009/0084405 A1 | 4/2009 | Kimura et al. | |
| 2009/0173443 A1 | 7/2009 | Kozlak et al. | |
| 2009/0321972 A1 | 12/2009 | Zinniel | |
| 2011/0033956 A1 | 2/2011 | Sakai | |
| 2012/0312335 A1 | 12/2012 | Sakai | |
| 2014/0246056 A1 | 9/2014 | Hiramoto et al. | |
| 2015/0045928 A1 * | 2/2015 | Perez | B29C 48/05 |
| | | | 700/110 |

FOREIGN PATENT DOCUMENTS

| | | |
|---|---|---|
| CN | 204526140 U | 8/2015 |
| CN | 205386940 U | 7/2016 |
| CN | 205817550 U | 12/2016 |
| DE | 04128699 A1 | 3/1993 |
| DE | 19527317 A1 | 2/1996 |
| DE | 19609783 A1 | 9/1997 |
| DE | 19939032 A1 | 10/2000 |
| DE | 102005037532 A1 | 2/2007 |
| DE | 10-2016-109861 A1 | 11/2017 |
| EP | 0581113 A1 | 2/1994 |
| EP | 0642845 A1 | 3/1995 |
| EP | 1249263 A2 | 10/2002 |
| EP | 1943051 A1 | 7/2008 |
| KR | 10-1509432 B1 | 4/2015 |
| RU | 2625848 C1 | 7/2017 |
| WO | WO-2003/089218 A1 | 10/2003 |
| WO | WO 2011/145960 A1 | 11/2011 |
| WO | WO 2015/108560 A1 | 7/2015 |
| WO | WO 2016/088042 A1 | 6/2016 |
| WO | WO-2016/201514 A1 | 12/2016 |
| WO | WO 2016/202094 A1 | 12/2016 |
| WO | WO-2016201614 A1 * | 12/2016 ......... B05B 17/0615 |

OTHER PUBLICATIONS

U.S. Appl. No. 16/476,511, filed Jul. 8, 2019, 2019/0375158, Pending.
Examination Report for Great Britain Application No. GB1721485.9, Mar. 6, 2020 (3 pages), South Wales, United Kingdom.
Intellectual Property Office, Great Britain Search Report for Great Britain Application No. GB1721485.9, Jun. 21, 2018, 4 pages, United Kingdom.
International Searching Authority, International Application No. PCT/GB2017/053841, Mar. 28, 2018, 11 pages, European Patent Office, The Netherlands.
Jasgurpreet Singh Chohan, Rupinder Singh, (2017) "*Pre and post processing techniques to improve surface characteristics of FDM parts: a state of art review and future applications,*" Rapid Prototyping Journal, vol. 23, Issue 3, pp. 495-513.
Chil-Chyuan Kuo et al., "*Polishing mechanism for ABS parts fabricated by additive manufacturing,*" Published online: Dec. 12, 2016, Springer-Verlag, London.
English translation of Opposition against European Patent No. EP3565712 filed Jun. 20, 2024 (55 pages).

* cited by examiner

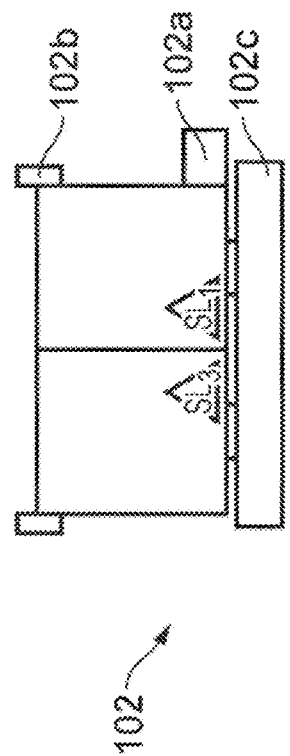
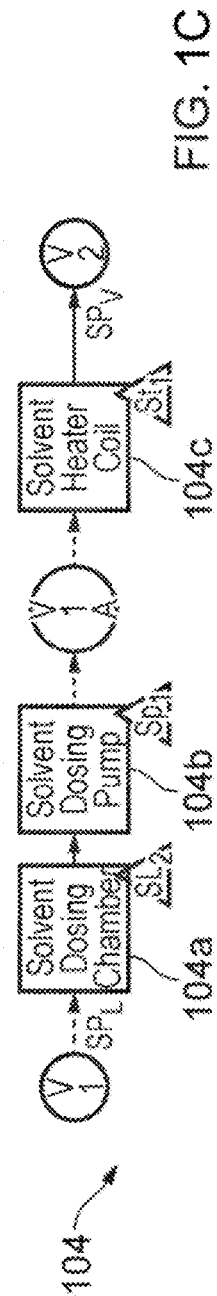
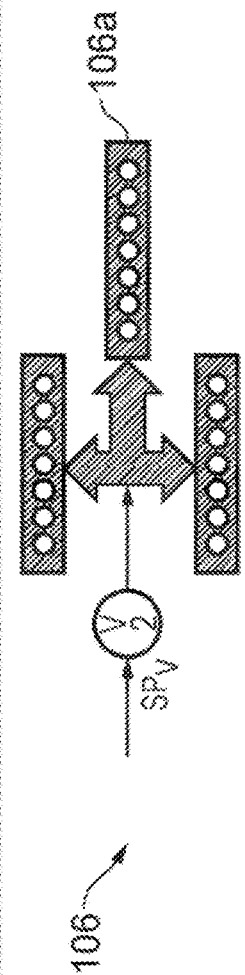
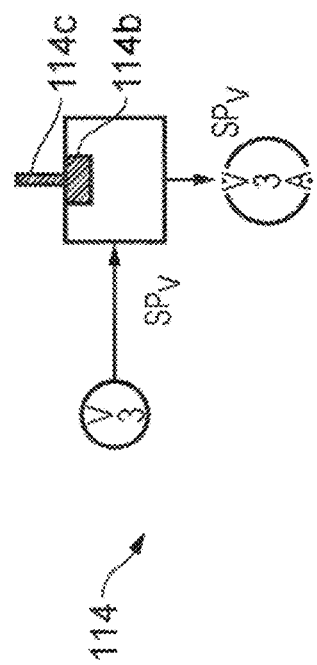
FIG. 1B
FIG. 1C
FIG. 1D
FIG. 1E

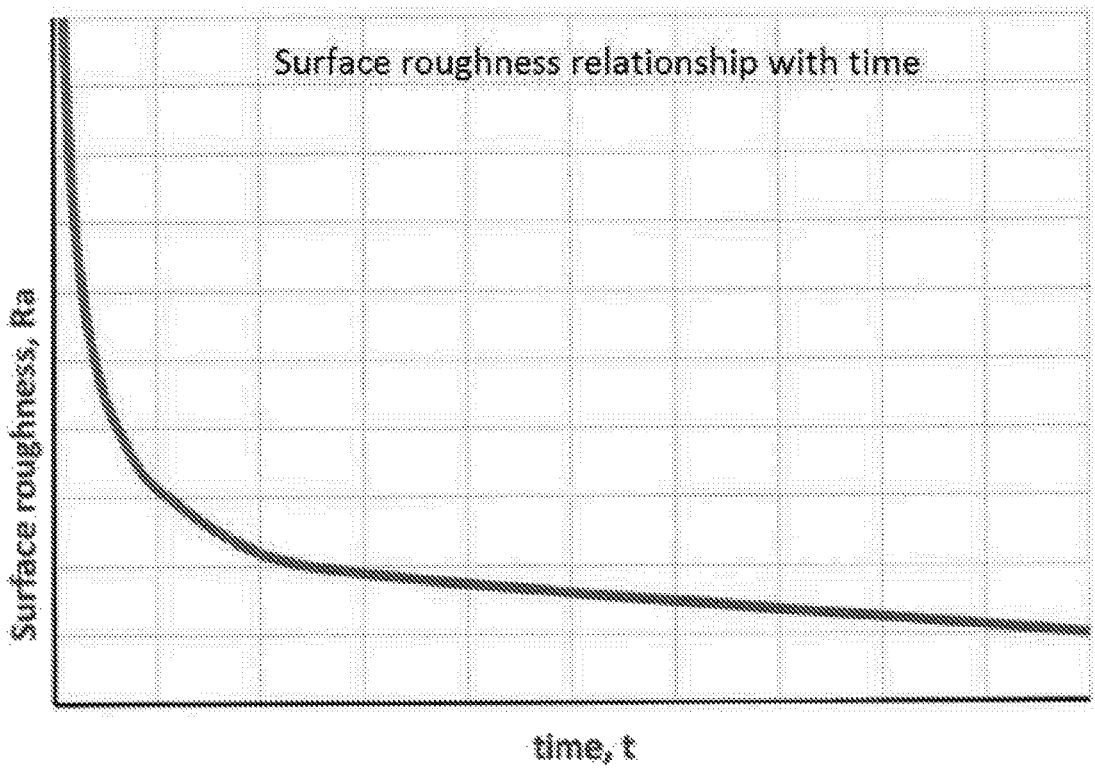

FIG. 3

| Figure 1a Ref | Sensor | Description | State/Units |
|---|---|---|---|
| 102 | SL1 | Virgin Solvent Level | Volume (ml) |
| 104a | SL2 | Level of liquid solvent in solvent dosing chamber | Volume (ml) |
| | SL3 | Used Solvent Level | Volume (ml) |
| 102a | QR1 | Quick Release coupling connected | On/Off |
| 104c | St1 | Solvent coil heating temperature | °C (Degrees Celsius) |
| 104c | SP1 | Solvent Dosing Pressure | Millibar |
| 108 | ACP1 | Actual Process Chamber Pressure | Millibar |
| 116 | aT | Inlet Air Temperature | °C (Degrees Celsius) |
| 108 | SS1 | Solvent VOC Sensor | On/Off |
| 112 | rsT | Peltier Temperature | °C (Degrees Celsius) |
| 122 | WL1 | Waste Water Level | Volume (ml) |

FIG. 4

| Figure 1a Ref | Parameter | Description | State/Units |
|---|---|---|---|
| - | V1 | Liquid solvent control valve | On/Off |
| 104b | SDs | Solvent dosing pump speed | ml/h |
| - | V1a | Liquid solvent control valve | Variable on/off |
| 104c | ST1 | Liquid solvent heating temperature | °C (Degrees Celsius) |
| - | V2 | Vapour solvent control valve | Variable three way on/off |
| 110 | VP1 | Vacuum Pump Pressure (Speed) Evaporation | rpm |
| 110 | VT1 | Vacuum Pump Pressure (Time) Evaporation | Seconds |
| - | V3 | Vapour Solvent Control Valve | Variable on/off |
| 116 | H1 | Inlet Air Heater | °C (Degrees Celsius) |
| 108 | PET1 | Part Exposure Time | Seconds |
| 110 | VP2 | Vacuum Pump Pressure (Speed) (Evaporation – Solvent Removal) | rpm |
| 110 | VT2 | Vacuum Pump Pressure (Time) (Evaporation – Solvent Removal) | Seconds |
| 112 | CT1 | Peltier Cooling/Heating Module Temperatures | °C (Degrees Celsius) |
| 112 | HCT1 | Solvent distilling heater coil temperature | °C (Degrees Celsius) |

FIG. 5

| Figure 1a Ref | Input | Description | State/Units |
|---|---|---|---|
| 108 | Do/DC | Process Chamber door Open/Closed | Open/Closed |
| 118 | ES1 | Emergency Stop Button Activation | On/Off |
| 118 | AT1 | Ambient Temperature monitoring | °C (Degrees Celsius) |
| 118 | AH1 | Ambient Humidity monitoring | Rh % |
| 118 | Nc | Max Number of cycles / surface area before replacement cartridge ordered | Integer n 1-100 / Surface area cm$^2$ |
| 118 | AP1 | Access Panel Removal | On/Off |

FIG. 6

| Figure 7 Ref | Sensor | Description | State/Units |
|---|---|---|---|
| 443 | Level Sensor 1 | Virgin Solvent Level | Volume (ml) |
| 445 | Level Sensor 2 | Recycled Solvent Level | Volume (ml) |
| 409 | Virgin Solvent Flow Meter | Amount of liquid solvent | Flow rate (ml/s) |
| - | Quick Release Coupling | Indicates if the solvent reservoir is connected | On/Off |
| 413 | Heating Plate Thermocouple | Solvent heating temperature. | °C (Degrees Celsius) |
| 423 | Pressure Sensor 1 | Pressure level within the process chamber | Millibar |
| 419 | Chamber Thermocouple 1 | Temperature within process chamber | °C (Degrees Celsius) |
| 451 | Chamber Heating Thermocouple | Temperature of the inner process chamber walls | °C (Degrees Celsius) |
| 425 | Lid Sensor | Indicates if the chamber lid is open or closed | On/Off |
| 421 | Lid Heating Thermocouple | Temperature of the lid | °C (Degrees Celsius) |
| 453 | Ambient Thermocouple | Thermocouple inside the machine to monitor ambient temperature | °C (Degrees Celsius) |
| 457 | Humidity Sensor | Humidity sensors inside the machine to monitor ambient humidity | % |
| - | Solvent VOC Sensor | Indicates of the presence of solvent within the chamber | On/Off |
| 461 | Vacuum Pump Inlet Thermocouple | Monitors the temperature of vacuum pump at the inlet | °C (Degrees Celsius) |
| 459 | Vacuum Pump Body Thermocouple | Monitors the temperature of vacuum pump within the pump body | °C (Degrees Celsius) |
| 463 | Vacuum Pump Outlet Thermocouple | Monitors the temperature of vacuum pump at the outlet | °C (Degrees Celsius) |
| 465 | Condenser Inlet Thermocouple | Monitors the temperature of condenser at the inlet | °C (Degrees Celsius) |
| 467 | Condenser Outlet Thermocouple | Monitors the temperature of condenser at the outlet | °C (Degrees Celsius) |
| - | Condenser Inner Thermocouple | Monitors the temperature within the condenser | °C (Degrees Celsius) |
| 469 | Condenser Pressure Sensor | Monitors the pressure within the condenser | Millibar |
| 437 | Used Solvent Flow Meter | Monitors the amount of recycled liquid solvent | Flow rate (ml/s) |

FIG. 9

| Figure 7 Ref | Control Unit | Parameter | Description | State/Units |
|---|---|---|---|---|
| - | -Control Valve | V1 | Liquid solvent control valve | On/Off |
| 405 | Peristatic Pump | SDs | Solvent dosing pump speed | ml/s |
| 407 | Control Valve | V1a | Liquid solvent dosing valve | Variable on/off |
| 411 | Heating plate | ST1 | Liquid solvent heating temperature | °C (Degrees Celsius) |
| - | Heater | CT1 | Temperature of process chamber walls | °C (Degrees Celsius) |
| - | Heater | CT2 | Temperature of lid | °C (Degrees Celsius) |
| 415 | Lid | L1 | Process Chamber door Open/Closed | Open/Closed |
| - | Emergency Button | EM1 | Emergency Stop Button Activation | On/Off |
| 427a | Control Valve | VA1 | Vent-to-air control valve | On/Off |
| 427b | Control Valve | VA2 | Vent-to-air control valve | On/Off |
| 410 | Vacuum Pump | VP1 | Vacuum Pump Pressure (Speed) Evaporation | rpm |
| 410 | Vacuum Pump | VT1 | Vacuum Pump Pressure (Time) Evaporation | Seconds |
| - | Control Valve | V2 | Vapour Solvent Control Valve | On/Off |
| 410 | Vacuum Pump | VP2 | Vacuum Pump Pressure (Speed) (Evaporation – Solvent Removal) | rpm |
| 410 | Vacuum Pump | VT2 | Vacuum Pump Pressure (Time) (Evaporation – Solvent Removal) | Seconds |
| 441 | Control Valve | VC1 | Cooler Inlet Air Valve | On/Off |
| 412 | Air cooler/condenser | C1 | Air cooling | °C (Degrees Celsius) |
| 408 | Process Chamber | PET1 | Part Exposure Time | Seconds |
| 412 | Solvent Recovery System/Condenser | HCT1 | Solvent recovering condenser temperature | °C (Degrees Celsius) |
| 429 | Control Valve | RC1 | Recovery System Valve Inlet | On/Off |
| 429 | Control Valve | RC2 | Recovery System Valve Outlet | On/Off |
| 437 | Control Valve | V1b | Used Solvent dosing Valve | On/Off |
| 433 | Peristatic Pump | US1 | Used Solvent Peristatic Pump | ml/s |
| - | Access Panel | AP1 | Access Panel Removal | On/Off |

FIG. 10

| Material | Process pressure, mBar | Process temperature, °C | Material temperature, °C | Processing start time, seconds | Amount of HFIP required per polymer surface area, ml/cm² |
|---|---|---|---|---|---|
| Polyamide 6 and 12 | 150 | 25 | 15 | 120 | 0.08 |
| Polyamide 11 | 200 | 27 | 10 | 110 | 0.12 |
| Thermoplastic polyurethane | 400 | 23 | -20 | 5 | 0.15 |

FIG. 11

| Material | 4-6μm (Ra) Matic surface | 4-6μm (Ra) glossy surface | 1-4 μm (Ra) Matic surface | 1-4 μm (Ra) glossy surface |
|---|---|---|---|---|
| Polyamide 6 and 12 | 2 min; $E_q$ low (0.3k) | 2 min; $E_q$ high (0.5k-0.8k) | 3 min; $E_q$ low (0.3k-0.5k) | 3 min; $E_q$ high (1k-1.2k) |
| Polyamide 11 | 2.5 min; $E_q$ low (0.6k) | 2.5 min; $E_q$ high (0.7k-1k) | 4 min; $E_q$ low (0.6k-0.7k) | 4 min; $E_q$ high (1k-1.2k) |
| Thermoplastic polyurethane | 1 min; $E_q$ low (1.5k) | 1 min; $E_q$ high (1.7k – 1.8k) | 2 min; $E_q$ low (1.5k-1.7k) | 2 min; $E_q$ high (1.8k-2k) |
| Material | <1 μm (Ra) Matic surface | <1 μm (Ra) glossy surface | | |
| Polyamide 6 and 12 | 7 min; $E_q$ low (0.3k-0.5k) | 7 min; $E_q$ high (>1.2k) | | |
| Polyamide 11 | 10 min; $E_q$ low (0.6k-0.7k) | 10 min; $E_q$ high (>1.2k) | | |
| Thermoplastic polyurethane | 10 min; $E_q$ low (1.5k-1.7k) | 10 min; $E_q$ high (>2k) | | |

FIG. 12

| Material | Residual solvent removing temperature, °C | Residual solvent removing pressure, mBar |
|---|---|---|
| Polyamide 6 and 12 | 110 | 850 |
| Polyamide 11 | 100 | 850 |
| Thermoplastic polyurethane | 85 | 650 |

METHOD OF SMOOTHING A SURFACE OF AN ADDITIVELY MANUFACTURED PART

CROSS-REFERENCE TO RELATED APPLICATIONS

This application is a continuation of and claims priority to and the benefit of U.S. application Ser. No. 16/476,511, filed Jul. 8, 2019, which United States Application is a National Stage Application, filed under 35 U.S.C. § 371, of International Application No. PCT/GB2017/053841, filed Dec. 20, 2017, which international application claims priority to and the benefit of United Kingdom Application No. 1700346.8, filed Jan. 9, 2017; the contents of all of which as are hereby incorporated by reference in their entirety.

BACKGROUND

Related Field

The present invention relates to additive manufacturing processes. In particular, but not exclusively, the present invention relates to post-processing of polymer parts which have been made by a powder based additive manufacturing process, such as laser or infrared sintering, or an extrusion based process such as fused deposition modelling (FDM).

Related Art

A motion simulator is a mechanism that can create, for an occupant, the effects or feelings of being in a moving vehicle and includes a motion system i.e. at least one motion generator and an associated control system. Motion simulators are used, professionally, for training drivers and pilots in the form of driving simulators and flight simulators respectively. They also are used, industrially, in the creation, design, and testing of the vehicles themselves.

Additive manufacturing (AM) is a process of joining materials to make objects from 3D model data, typically layer-upon-layer, as opposed to subtractive manufacturing techniques, such as milling or cutting. AM processes are generally classed according to the machines and technologies used, e.g. laser or extrusion, and the state of the raw material used, i.e. liquid-based, powder-based, or solid-based. The different processing conditions encountered in AM produce different mechanical properties and surface finishes, particularly compared to traditional manufacturing techniques. For example, the surface finish of injection moulding is determined by the mould, whereas the outer surface of AM parts has a rough feel and is visually dull as a result of the layer-upon-layer process. Such a surface finish is often undesirable, particularly if the part is intended for an aesthetic application. Furthermore, surface roughness may adversely affect the mechanical performance of the AM part, such as tear strength, tensile and/or bending strength, Young's modulus of the material, and fracture strain. Additionally, a rough surface finish may be difficult to clean, may stain easily, or may cause undesirable damage to adjacent parts in use.

As such, AM parts are often post-processed after manufacture in an attempt to smooth the often undesirable rough outer surface and sometimes also to remove support structures used in the manufacturing process. The two key categories of post-processing are primary and secondary post-processing. Primary post-processing typically includes the mandatory steps that must be performed on all AM parts to make them suitable for use in any application. These steps vary by technology but generally include cleaning and support structure removal. Secondary post-processing includes optional part finishing to improve the aesthetics and/or function of the part. Most commonly, secondary post-processing includes sanding, filling, priming, and painting. Typically, polymer AM parts are mechanically tumbled, sanded or coated to improve the surface appearance and feel. However, these primary and secondary post-processing steps are manual which adds significant cost and time to the manufacturing process in view of the significant hands-on labour which is required, and which thus potentially erodes the benefits of AM in some applications. Such manual post-processing can also introduce unquantifiable dimension variation in the final part geometry and it is difficult, if not impossible, for a part finisher to obtain exactly the same amount and degree of finishing for each part, i.e. a repeatable and reproducible surface finish. For intricate parts with delicate features, a duplicate part is often manufactured just in case the original is damaged or broken during the post-processing stage, which undesirably further increases costs, energy and materials. Fine detailing on an AM part may be irrevocably lost as a result of manual post-processing techniques. Furthermore, the manual post-processing techniques are 'line of sight' processes and are not suitable for smoothing hidden/intricate features, such as inner surfaces of lattice structures, for example.

As such, the perception that AM techniques offer a digital workflow that is simple, fast and automated is only accurate up to the moment the AM parts are removed from the AM machine. As soon as the AM parts enter the post-processing phase, the automated, push-button process becomes a manual operation that undesirably impacts time, cost, materials, energy and quality.

The use of a solvent vapour, such as Acetone, to improve the surface finish of AM parts primarily made from ABS type materials is known. Such a treatment relies on a suitable solvent to dissolve some of the rough outer surface of the AM part to enhance the surface smoothness, gloss and potentially the mechanical properties of the part itself. However, these known solvent treatments are also manual and labour intensive and thus suffer from the same disadvantages as the mechanical techniques described above. Furthermore, known solvent treatments are not suitable for improving the surface finish of Nylon 12 which is the most common polymer used for laser sintering and which is part of the polyamide group of materials which are particularly resistant to chemicals such as Acetone. In addition, in some cases there has been found to be an increase in weight of the AM part after using a solvent post-processing treatment to improve surface finish. This undesirable weight gain can be up to 8% and has been found to be a result of water absorption (particularly in Nylon™ materials) in the surface layers of the AM part.

BRIEF SUMMARY

It is an aim of certain embodiments of the present invention to provide an automated method of post-processing an AM polymer part to improve the surface finish thereof without compromising the integrity, appearance or performance of the part.

It is an aim of certain embodiments of the present invention to provide an automated method of post-processing an AM polymer part to improve the surface finish thereof which is efficient and consistent in terms of quality, time, cost and materials.

It is an aim of certain embodiments of the present invention to provide an automated method of post-processing an AM polymer part to improve the surface finish thereof by exposing the AM part to a solvent in a controlled manner to achieve a desired surface finish without undesirable weight gain.

It is an aim of certain embodiments of the present invention to provide an automated method of post-processing an AM polymer part in an 'intelligent' manner whereby machine learning from multiple apparatuses is used to improve the processing parameters and efficiency of the part finishing process.

It is an aim of certain embodiments of the present invention to provide apparatus for carrying out an automated method of post-processing an AM polymer part to improve the surface finish thereof in a controlled and automated manner which is efficient and environmentally friendly.

According to a first aspect of the present invention there is provided apparatus for post-processing an additively manufactured polymer part, comprising: a reservoir for containing a liquid solvent; a processing chamber in controllable fluid communication with the reservoir; and a controller configured to controllably post-process an additively manufactured polymer part located in the processing chamber by the solvent responsive to at least one parameter associated with the part.

Optionally, the at least one parameter comprises a material of the part, a desired surface roughness of the part, and/or a geometric property of the part including surface area, volume, dimension, and/or part complexity.

Optionally, the apparatus further comprises a vacuum pump operably controllable by the controller and configured to apply a negative pressure to an interior of the processing chamber.

Optionally, the controller is configured to selectively operate the vacuum pump for a predetermined time to apply a negative pressure in the processing chamber.

Optionally, the negative pressure is around 10-400 mbar.

Optionally, the apparatus further comprises a solvent delivery valve operably controllable by the controller to allow a predetermined amount of solvent to be selectively drawn into the processing chamber by the negative pressure applied therein.

Optionally, the apparatus further comprises a solvent delivery system located upstream of the processing chamber and operably controllable by the controller for selectively receiving solvent from the reservoir and introducing a predetermined amount of solvent into the processing chamber.

Optionally, the solvent delivery system comprises a pump and a dosing valve for controlled delivery of the predetermined amount solvent into the processing chamber.

Optionally, the solvent delivery system further comprises a heating element configured to controllably heat the predetermined amount of solvent to a predetermined solvent temperature.

Optionally, the predetermined solvent temperature causes the solvent to vaporise.

Optionally, the solvent is introduced into the processing chamber via a solvent distribution system.

Optionally, the solvent distribution system comprises at least one nozzle for controlled distribution of solvent vapour into the processing chamber.

Optionally, the apparatus further comprises a heater for controlled heating of an interior of the processing chamber to a predetermined chamber temperature.

Optionally, the heater comprises a heating element configured to controllably heat at least one inner surface of the processing chamber.

Optionally, the apparatus further comprises a cooler for controlled cooling of an AM part located in the processing chamber.

Optionally, the controller is configured to selectively operate the vacuum pump for a further predetermined time to reapply a negative pressure in the processing chamber after a predetermined processing time has elapsed.

Optionally, the processing time is between around 5 seconds to around 120 minutes based on the at least one parameter.

Optionally, the vacuum pump is further configured to selectively vent the processing chamber to atmosphere when the negative pressure has been reapplied to extract solvent vapour from the processing chamber and from the part located therein.

Optionally, the apparatus further comprises a solvent recovery system to recover used solvent from the processing chamber.

Optionally, the solvent recovery system comprises a condenser to separate solvent from air.

Optionally, the solvent recovery system is fluidly connected with the reservoir and/or the solvent delivery system such that recovered used solvent can be returned thereto.

Optionally, the reservoir comprises a first compartment for virgin solvent and a further compartment for recovered solvent.

Optionally, the apparatus further comprises a user interface for a user to input the material of the part to be processed and the desired surface roughness, wherein the controller is further configured to execute a processing program based on at least the material and the desired surface roughness.

According to a second aspect of the present invention there is provided a method of post-processing an additively manufactured polymer part, comprising: locating an additively manufactured polymer part in a processing chamber; and responsive to at least one parameter associated with the part, controllably post-processing the part by a solvent controllably introduced into the processing chamber.

Optionally, the at least one parameter comprises a material of the part, a desired surface roughness of the part, and/or a geometric property of the part including surface area, volume, dimension, and/or complexity.

Optionally, the method further comprises selectively delivering a predetermined amount of solvent into the processing chamber.

Optionally, the method further comprises applying a negative pressure to an interior of the processing chamber for a predetermined time.

Optionally, the method further comprises using the negative pressure to selectively deliver the predetermined amount of solvent into the processing chamber.

Optionally, the method further comprises heating the predetermined amount of solvent to a predetermined solvent temperature to cause the solvent to vaporise prior to entering the processing chamber.

Optionally, the method further comprises selectively heating an interior of the processing chamber to a predetermined chamber temperature.

Optionally, the method further comprises heating at least one inner surface of the processing chamber.

Optionally, the method further comprises creating an energy potential between an AM part located in the processing chamber and the solvent.

Optionally, the method further comprises selectively cooling an AM part located in the processing chamber to create the energy potential and cause solvent vapour to condense on the AM part.

Optionally, the method further comprises reapplying a negative pressure in the processing chamber for a predetermined time after a predetermined processing time has elapsed.

Optionally, the method further comprises selectively venting the processing chamber to atmosphere when the negative pressure has been reapplied to extract solvent vapour from the processing chamber and from the part located therein.

Optionally, the method further comprises recovering used solvent from the processing chamber.

Optionally, the method further comprises returning recovered used solvent to the reservoir.

Optionally, the method further comprises inputting or selecting the at least one parameter associated with the part via a user interface.

Optionally, the method further comprises executing a processing program by a controller based on the at least one parameter.

According to a third aspect of the present invention there is provided a computer program that, when executed by a computer, performs the method according to the second aspect of the present invention.

According to a fourth aspect of the present invention there is provided a use of a solvent to controllably post-process an additively manufactured polymer part responsive to at least one parameter associated with the part.

Optionally, the solvent is selected from a group including 1,1,1,3,3,3-hexafluoro-2-propanol (HFIP), dimethylformamide, sulphuric acid, m-cresol, formic acid, trifluoroacetic acid, and benzyl alcohol.

Optionally, the use further comprises selectively creating an energy potential between an AM part and the solvent.

Optionally, the use further comprises selectively controlling a solvent temperature and an AM part temperature wherein the solvent temperature is greater than the AM part temperature.

Optionally, the use further comprises heating the solvent to a predetermined solvent temperature and cooling the AM part to create a desired temperature gradient therebetween to cause solvent vapour to condense on the AM part for a predetermined processing time.

BRIEF DESCRIPTION OF THE FIGURES

Certain embodiments of the present invention will now be described with reference to the accompanying drawings in which:

FIGS. 1B to 1E illustrate schematics of various parts of the apparatus of FIG. 1A.

FIG. 3 illustrates the relationship between surface roughness and exposure time according to certain embodiments of the present invention;

FIG. 4 illustrates a list of sensors of the apparatus of FIG. 1A;

FIG. 5 illustrates a list of parameters controllable by the apparatus of FIG. 1A;

FIG. 6 illustrates a list of inputs monitored by the apparatus of FIG. 1A;

FIG. 9 illustrates a list of sensors of the apparatus of FIG. 7;

FIG. 10 illustrates a list of parameters controllable by the apparatus of FIG. 7;

FIG. 11 illustrates thermodynamic processing conditions for different AM polymers to be smoothed in accordance with certain embodiments of the present invention;

FIG. 12 illustrates processing time and energy potential levels for various surface finishes in accordance with certain embodiments of the present invention;

DETAILED DESCRIPTION OF VARIOUS EMBODIMENTS

Figure 1A:
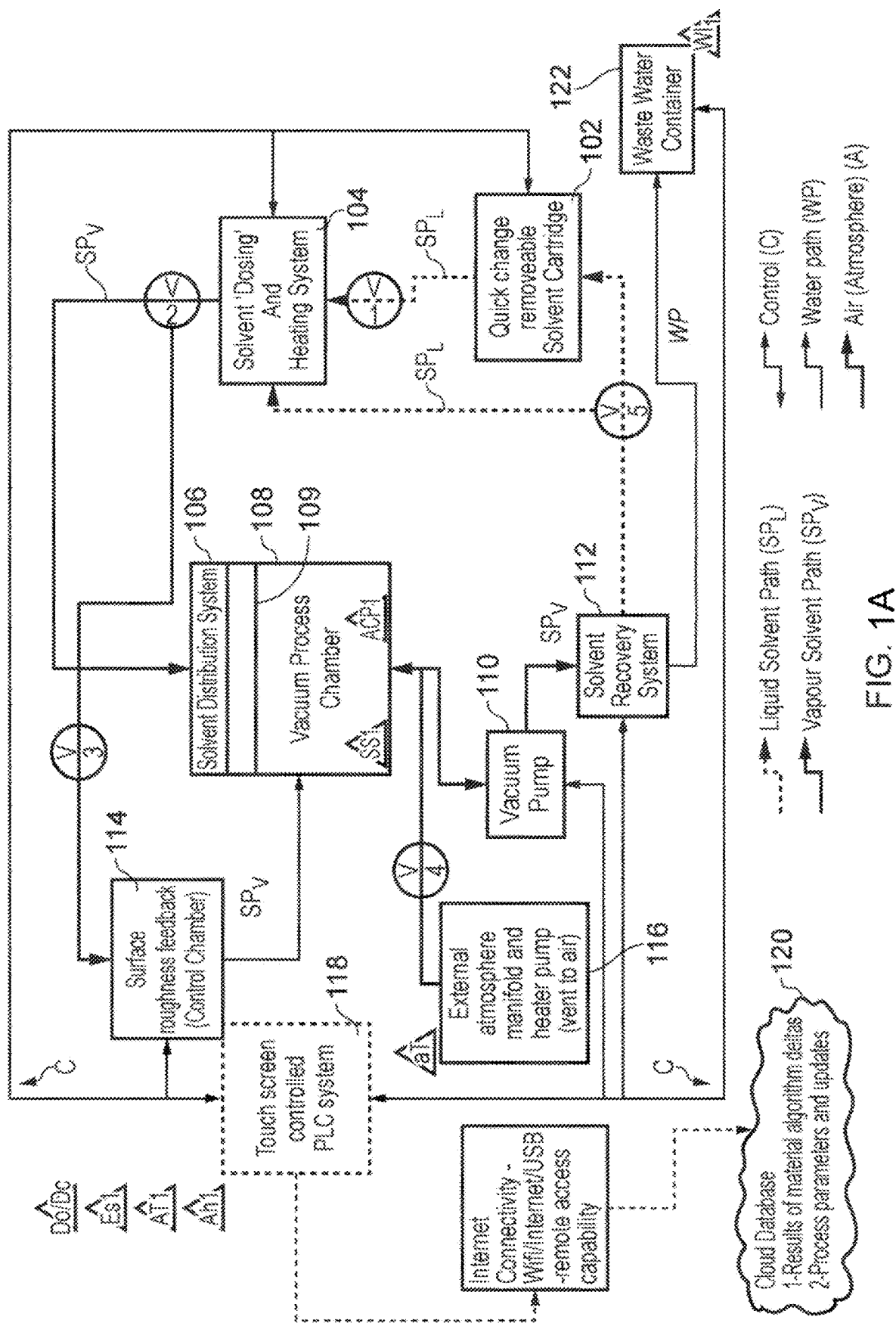
FIG. 1A illustrates a schematic of an AM part post-processing apparatus according to certain embodiments of the present invention.

As shown in FIG. 1A, apparatus 100 according to certain embodiments of the present invention includes a removable solvent cartridge 102, a solvent dosing and heating system 104 for containing a solvent, a solvent distribution system 106, a processing chamber 108, a vacuum pump 110, and a solvent recovery system 112. The apparatus also includes a control chamber 114 connected to the solvent dosing and heating system 104 and an air heater pump 116 for venting heated air into the processing chamber 108. The processing chamber 108 also contains a part support system 109 such as a rack or the like.

A first control valve Vi is located between the solvent cartridge 102 and the solvent dosing/heating system 104. A second control valve V2 is located between the solvent dosing/heating system 104 and the solvent distribution system 106. A third control valve V3 is located between the solvent dosing/heating system 104 and the control chamber 114. A fourth control valve V4 is located downstream of the chamber, aptly at the vacuum pump 110, to allow the apparatus, particularly the processing chamber 108, to be selectively vented to atmosphere. A fifth control valve V5 is located between the solvent recovery system 112 and the solvent dosing and heating system 104/solvent cartridge 102. Valve V5 is a diverter valve which selectively controls the flow of recovered solvent to the solvent dosing and heating system 104 or the cartridge 102 as described further below.

The apparatus 100 further includes a controller 118 having a user interface, e.g. a touchscreen display, to allow an operator to input predetermined parameters associated with the AM part to be post-processed, as will be described further below. An operator may interact with the controller either at the apparatus or remotely via a wired or wireless connection by using an application stored on a computing device such as a tablet or mobile phone. The controller 118 is electrically connected to the controllable components through a computer system such as a Raspberry Pi™ or other open or closed sourced system, to the systems and sensors of the apparatus 100 to allow the controller to automatically and selectively control the apparatus, whilst also receiving feedback signals during a post-processing operation, as described further below. The controller is also configured to record apparatus ambient operating conditions, namely ambient temperature AT1 and humidity AH1 while the apparatus is in use. The controller is aptly connected to an emergency stop button ES1 to immediately stop the machine should it be required. A sensor AP1 is also present to stop the apparatus 100 in the event of any maintenance access panels being removed during operation. The controller 118 is also in read/write communication with a data storage medium, such as a cloud-based database 120, to allow operating parameters, programs and data to be accessed and/or stored. For illustrative purposes only, the flow of solvent in a liquid state during the postprocessing operation is shown by a dot-dashed line and referenced SPL. The flow of solvent in a vapour state is shown by a relatively thick solid line and referenced SPv. The flow of water is referenced WP and the flow of air is referenced A. The control links are shown in a relatively thin line and referenced C.

Figure 2:
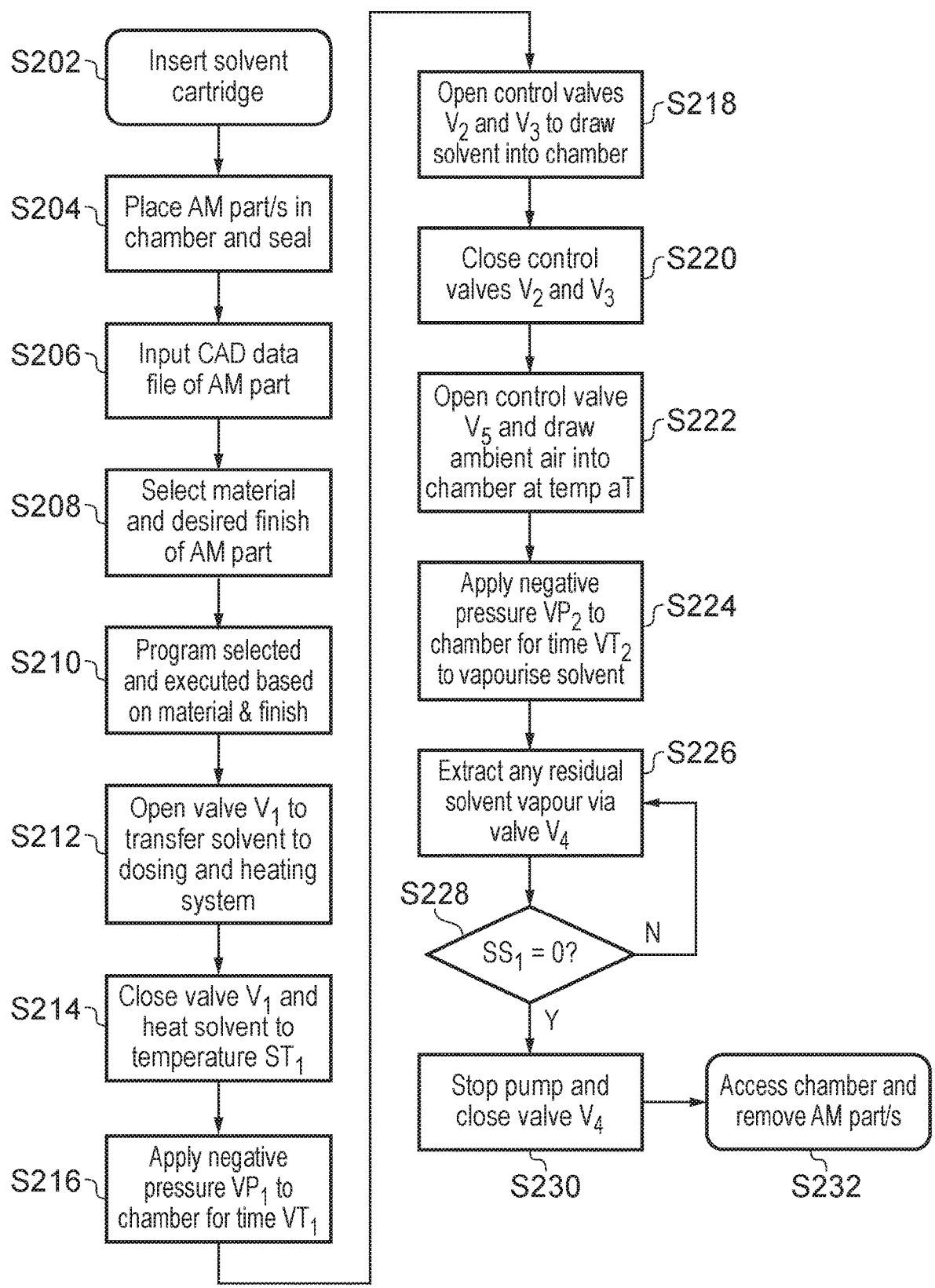
FIG. 2 illustrates the post-processing steps of a method using the apparatus of FIG. 1A.

FIG. 2 illustrates a flow diagram showing the steps of a method S200 of postprocessing an AM part using the apparatus 100 according to certain embodiments of the present invention. As illustrated at step S202, a 'pre-packaged' and sealed cartridge 102 containing a suitable solvent is selected and removably coupled to the apparatus 100 via a suitable connection 102c such as a quick release mechanism or the like. As shown in FIG. 1B, the solvent cartridge 102 includes two compartments; one for virgin solvent and another for used solvent. A sensor SLi senses the virgin solvent level and a sensor S1_3 senses the used solvent level. The virgin solvent compartment has at least an outlet and the used solvent compartment has at least in an inlet for returning used solvent to the cartridge as described further below. The cartridge 102 includes a closed source electronics chip 102a which communicates with the controller 118 to allow sensor signals to be operably sent thereto. The cartridge 102 also includes a quick release coupling handle mechanism 102b for handling the cartridge when connecting to and removing from the apparatus. The handle mechanism 102b may be coupled to the connection mechanism 102c such that the handle mechanism 102b actuates a quick connect/release coupling mechanism 102c to quickly and easily couple/remove the cartridge to/from the apparatus. A sensor QRi (not shown) may be provided to confirm to the controller 118 that the cartridge is properly located and connected to the apparatus.

Suitable solvents include protonic polar solvent and non-proton polar solvents, such as, but not limited to, 1,1,1,3,3,3-hexafluoro-2-propanol (HFIP), dimethylformamide, sulphuric acid, m-cresol, formic acid, trifluoroacetic acid, and benzyl alcohol. Aptly a solvent that exhibits strong hydrogen bonding properties may be used. This property will allow the solvent to process substances that serve as hydrogen bond acceptors, such as Nylons™ (Polyamides).

At step S204, at least one AM polymer part is placed in the processing chamber 108 via an access door thereof, such as a scalable lid located on an upper surface of the apparatus for easy access, and on to an optional support structure 109, such as racking, located in the chamber. The support structure 109 is configured to ensure the part is fully exposed to solvent introduced into the chamber. The access door/lid is closed and the chamber 108 is sealed. The chamber 108 is sealed once a process chamber door sensor Do/Dc indicates that the door is closed.

Aptly, via the user interface of the controller 118, or automatically in response to the chamber being sealed and/or a part being located therein, a systems check is run by the controller 118 to ensure the apparatus 100 is in a 'neutral' state and ready to process AM parts. The neutral state check ensures that all control valves are in the correct positions, the solvent cartridge contains a sufficient amount of virgin solvent and has been correctly coupled to the apparatus, and the process chamber door/lid is securely closed.

At S206, a user inputs a digital CAD file into the controller 118 for the AM part to be processed either via the Internet/Ethernet/wireless connection from a program/application or from a database of pre-stored CAD data files. The CAD file details the parts to be processed in the orientation and position they are located on the support structure 109 in the processing chamber 108. This ensures repeatability and reproducibility and also allows accurate calculation of processing parameters by understanding the surface area and 'complexity' of the parts. At S208, via the user interface of the controller 118, the user selects the material of the AM part and the desired surface finish, e.g. roughness, which in turn determines the required processing program to be selected and run by the controller. The part material may be selected from a non-exhaustive list of materials including Nylon 12 (PA220 Duraform™ PA), Nylon 11 (Duraform™ EX Natural, Duraform™ EX Black), Thermoplastic Polyurethane (TPU), TPE-210 elastomer materials, ABS, or the like. The touchscreen display may list a number of selectable materials for the user to select responsive to the AM part to be post-processed. The surface roughness may be selected from a range of around 1.5 µm to the 'as printed' surface roughness (i.e. no smoothing), in around 1 µm increments. Alternatively, a surface finish may be selected based on finish descriptions, e.g. matt or gloss, and/or visual examples displayed on the display of the user interface or mobile computing device.

At step S210, the processing program is selected by the controller 118 in response to the selected part material and desired surface roughness and is then executed.

As shown in FIG. 1C, the solvent dosing/heating system 104 includes a solvent dosing chamber 104a and a solvent level sensor S1_2 to sense a level of solvent therein, a solvent dosing pump 104b and a pressure sensor Spi to sense a pressure of the solvent being pumped thereby, a further control valve VIA, and a solvent heating element 104c, such as a heating coil, and a temperature sensor Sti to sense a temperature of the solvent in the heating system 104.

At step S212, the first control valve Vi is opened by the controller 118 and a predetermined amount of solvent to at least partially fill the chamber 104a of the solvent dosing/heating system 104, aptly around 1000 ml, is transferred from the cartridge 102 to the solvent dosing/heating system 104 using the solvent dosing pump 104b at a controlled solvent pump dosing speed SDs. At step S214, the first control valve Vi is closed. A predetermined dose of liquid solvent is transferred from the dosing chamber 104a to the solvent heater coil 104c via valve V1 A by the solvent dosing pump 104b. The 'dose' of liquid solvent is heated through the solvent heater coil 104c to a predetermined temperature Sti by suitable heating means, e.g. an electrical heating element located in or around the solvent heater coil 104c. The solvent quantity is calculated as a function of the type of solvent being used, the volume of the processing chamber 108, the surface area of the part/s, the processing temperature (a function of solvent boiling point) and the processing pressure (vacuum). The dosing amount from the solvent dosing chamber through the heating coil is around 25-200 ml. The relationship determines the correct amount of solvent in order to achieve the required uniform layer thickness across all the parts to be processed. Alternatively, the cartridge 102 itself may be heated by a separate or integral heating means, such as an electrical heating element disposed in the cartridge, to elevate the temperature of the solvent therein to the predetermined temperature Sri. In such an embodiment, the solvent dosing/heating system 104 may not be required and the solvent may be introduced into the processing chamber 108 directly from the cartridge instead of via the dosing/heating system 104. The solvent is heated to enable a range of solvents with different boiling points to be processed effectively. The solvent temperature Sti may be between room temperature and 100° C. depending on the type of solvent to be used for the AM part being processed. Some solvents may not require heating. Preheating the solvent to transform it into a vapour phase before it is introduced into the processing chamber 108 allows a lower pressure differential (vacuum) to be applied to the solvent, and therefore less energy, to transform the solvent from a liquid state to a vapour state and draw the solvent vapour into the processing chamber 108. In addition, the ability to heat the solvent can speed up the thermodynamic process of solvent evaporation.

At step S216, a negative pressure is then applied inside the processing chamber 108 by the vacuum pump 110 for a vacuum time VTi to create a reduced chamber pressure VPi of about around 10-200 mbar, and aptly around 70 mbar. Aptly, an absolute vacuum may be created in the processing chamber 108. The critical pressure as measured by sensor ACPI in the processing chamber 108 is defined as the point below which the solvent will evaporate at room temperature, i.e. at the critical point when the solvent is in the vapour phase before entering the gaseous phase if the pressure/temperature was increased.

At step S218, the second and third control valves V2 and V3 are opened and the pressure difference between the solvent dosing/heating system 104 and the processing chamber 108 and the control chamber 114 draws the solvent into both chambers 108, 114. In view of the pressure differential between the solvent vapour at atmospheric pressure and the selected vacuum pressure VPi applied to the chambers 108, 114, the 'dose' of solvent is instantly drawn into the processing chamber 108 and the control chamber 114 and instantly fills the chambers 108, 114. The AM part/s located in the processing chamber 108 and a test coupon/specimen located in the control chamber 114 are fully surrounded by solvent vapour. The dosing quantity is controlled by the solvent dosing/heating system 104 and is defined as the amount of solvent required to fully saturate the vapour phase. This is governed by the vapour-liquid equilibria of the specific solvent in relation to the temperature and pressure of the vapour and liquid phases. As shown in FIG. 1D, the solvent distribution system 106 includes three distribution channels 106a each having a plurality of apertures equally spaced to ensure even and rapid introduction of the solvent vapour phase into the vacuum process chamber 108. As an alternative, or in addition, to a negative pressure being applied to the processing chamber 108, a positive pressure may be applied to the solvent to urge the same into the chambers 108, 114 from the solvent reservoir 104.

At step 220, the second and third control valves V2 and V3 are closed.

At step 222, the fourth control valve V4 is opened and ambient air heated by a suitable heater H1 (not shown) of the heater pump 116 to a predetermined temperature aT is drawn or pumped into the processing chamber 108. With increased temperature and pressure in the processing chamber 108, the solvent vapour instantly condenses onto the AM part/s to form a uniform residue and even film of solvent in the liquid state on the part's outer surfaces. Alternatively, the second control valve V2 may be opened to expose the processing chamber 108 to the solvent dosing/heating system 104 and thereby to additional solvent to control the desired condensation rate.

The condensed liquid solvent film is maintained on the AM part/s for a predetermined part exposure time PET1 which can range from around 5 seconds for Nylon 12 parts to around 10 minutes for TPU type parts. As illustrated in FIG. 3, the predetermined part exposure time PETi determines the final surface roughness of the part/s and can be controlled to around 1.5 µm.

When the predetermined part exposure time PETi for the part/s being processed has been reached, the vacuum pump 110 (at step S224) applies a negative pressure VP2 of about around 10-200 mbar to the processing chamber 108 for a predetermined time VT2. The reapplication of a negative pressure to the processing chamber 108 increases vapour pressure to return the condensed solvent from a liquid state to a vapour state.

At step S226, the fourth control valve V4 is opened and the processing chamber 108 is vented to atmosphere through the vacuum pump 110 and the solvent vapour is fully removed from the surface of the processed AM part/s and from the processing chamber 108 itself. A carbon filter is present on the external atmosphere manifold and heater pump to ensure no solvent vapour is released into the atmosphere. No residual vapour remains on the surface of the part/s, no residual trace is left, and in turn the post-processing of the part/s is immediately stopped. This not only ensures the process is fully controlled, but also some applications, such as for medical or dental devices, require the parts to be fully clean and safe to use, and also to possess a particularly accurate surface roughness which would not be achievable if any further processing of the part occurred as a result of any remaining solvent residue on the surfaces of the part.

A solvent sensor SSi is located in the processing chamber 108 to sense the presence of solvent vapour therein and send a signal to the controller 118 indicating whether or not solvent exists in the chamber 108. At step S228, the extraction/drying step is repeated until no solvent (Volatile Organic Compounds-VOCs) is detected within the chamber 108 by the solvent sensor SSi located therein. The solvent vapour extracted from the processing chamber 108 may be passed through a solvent recovery unit 112, which consists of a Peltier module heat pump system or the like. The solvent vapour is condensed across the Peltier heat pump system in the solvent recovery system 112 at a predetermined temperature CT1, and the condensed liquid (solvent and water in view of the heated ambient air being introduced into the processing chamber at step S222) is collected in a liquid trap at the bottom of the solvent recovery system 112. The liquid (containing both the solvent and water) is then distilled through a heater coil at a temperature HCT1 above the solvent's boiling temperature, but below the water's boiling temperature, i.e. 100° C.). This vaporises the solvent, while keeping the water in the liquid phase. The re-vaporised solvent is then passed back through the Peltier heat pump to condense from a vapour to a liquid. The water is recovered in the waste water container 122. Alternatively, a molecular sieve may be used to remove the water from the system. The recovered solvent is then returned to the solvent dosing/heating system 104 via the fifth control valve Vs. The apparatus 100 therefore forms a closed loop. The solvent is used for around a hundred operations or until a maximum surface area processed has been reached, whichever is sooner, before being recovered and sent to the used solvent compartment of the cartridge 102 via the diverter valve Vs for safe disposal. Before the cartridge 102 reaches it end of useful life and needs replacing, the electronic chip 102a which is configured to monitor how often solvent is recycled through the cartridge using sensor Nc will automatically communicate with the controller 118 such that a new cartridge is automatically or manually ordered for delivery. The used cartridge is removed and a new cartridge containing 'fresh' solvent is inserted for the next operation. The water product from the distillation is directed to a waste water container 122 for safe collection and disposal by the operator. The waste water container 122 includes a water level sensor WLI (not shown) to indicate when the container needs emptying or replacing. At step S230, in response to signal SSi indicating no solvent vapour remains in the processing chamber 108, the controller 118 stops the vacuum pump 110 and closes the fourth valve V4. The processing program ends and the operator is notified by an audible and/or visual indication. At step S232, the access door of the apparatus 100 is opened to retrieve the post-processed AM polymer part/s from the processing chamber 108. The process is repeated as desired. As shown in FIG. 1E, a test coupon 114b, e.g. a dog bone specimen, which is made by the same AM process and from the same material as the AM part/s being processed is located in the control chamber 114 which is not subject to a vacuum and is thus subject to potential water uptake from the surrounding atmosphere.

During post-processing, the test coupon is subjected to the solvent vapour for the same solvent exposure time of PET1 as the AM part being processed and the weight of the test coupon is continually monitored by suitable means, such as a load cell 114c. There is an increase in weight with improvement in surface roughness. This relationship has been quantified and the mass gain, which can be up to 8%, is known to be due to water absorption in the surface layers and not uptake of solvent. The original part weight calculated from the CAD data (under vacuum and without water uptake) is compared to a test coupon outside the vacuum chamber (not under vacuum and subject to water uptake). The test samples require the same surface area to volume ratio as the part being smoothed in order to provide accurate feedback.

The relationship between sample weight increase as a function of solvent exposure time PET1 is used to calculate the actual achieved surface roughness. To ensure the relationship between the control chamber 114 and the processing chamber 108 conditions are in calibration, the correlation therebetween is generated through experimental feedback and results from iterative testing for a known sample quantity and surface finish per type of material. Alternatively, a non-contact optical method such as laser measurement and/or a white light interferometer or laser scanning confocal microscope could be used on the sample part in the control chamber 114 to determine surface roughness changes in real time. In this manner, it is possible to continuously assess if the AM part/s being smoothed in the processing chamber 108 and to ensure that the parts have been processed to the correct surface roughness. If the desired surface roughness has not been achieved, using feedback from the load cell data (or direct non-contact surface roughness measurement) in the control chamber 114, the processing parameters may be adjusted in real time and the AM part/s in the processing chamber 108 will automatically be processed again until the desired surface roughness is achieved. Opening valve V3a (as shown in FIG. 1E) at the end of the process allows the control chamber 114 to be exposed to the vacuum in the processing chamber 108 thus safely evacuating any solvent vapour and removing any solvent present on the surface of the sample located therein.

As such, automatic measurement of a test coupon's weight gain using a load cell whilst the AM part is being post processed accurately controls the amount (volume and time) of solvent exposure to the AM part being processed and in turn the degree of part smoothing required to achieve the desired surface finish. Furthermore, the relationship between weight gain in the test coupon and surface finish of the AM part will be created as part of the data sets generated, and the controller 118 is configured to use this feedback and learn over time what parameters are required to obtain a desired surface finish responsive to part material, geometry, surface area, and/or solvent type. This also enables real time verification of results and processing in the form of a closed feedback loop.

For each operation, the controller 118 monitors and logs all the operating variables as listed in the tables of FIGS. 4 to 6 and uploads them to a read/write database stored on a web-based server 120 or the like.

Figure 7:
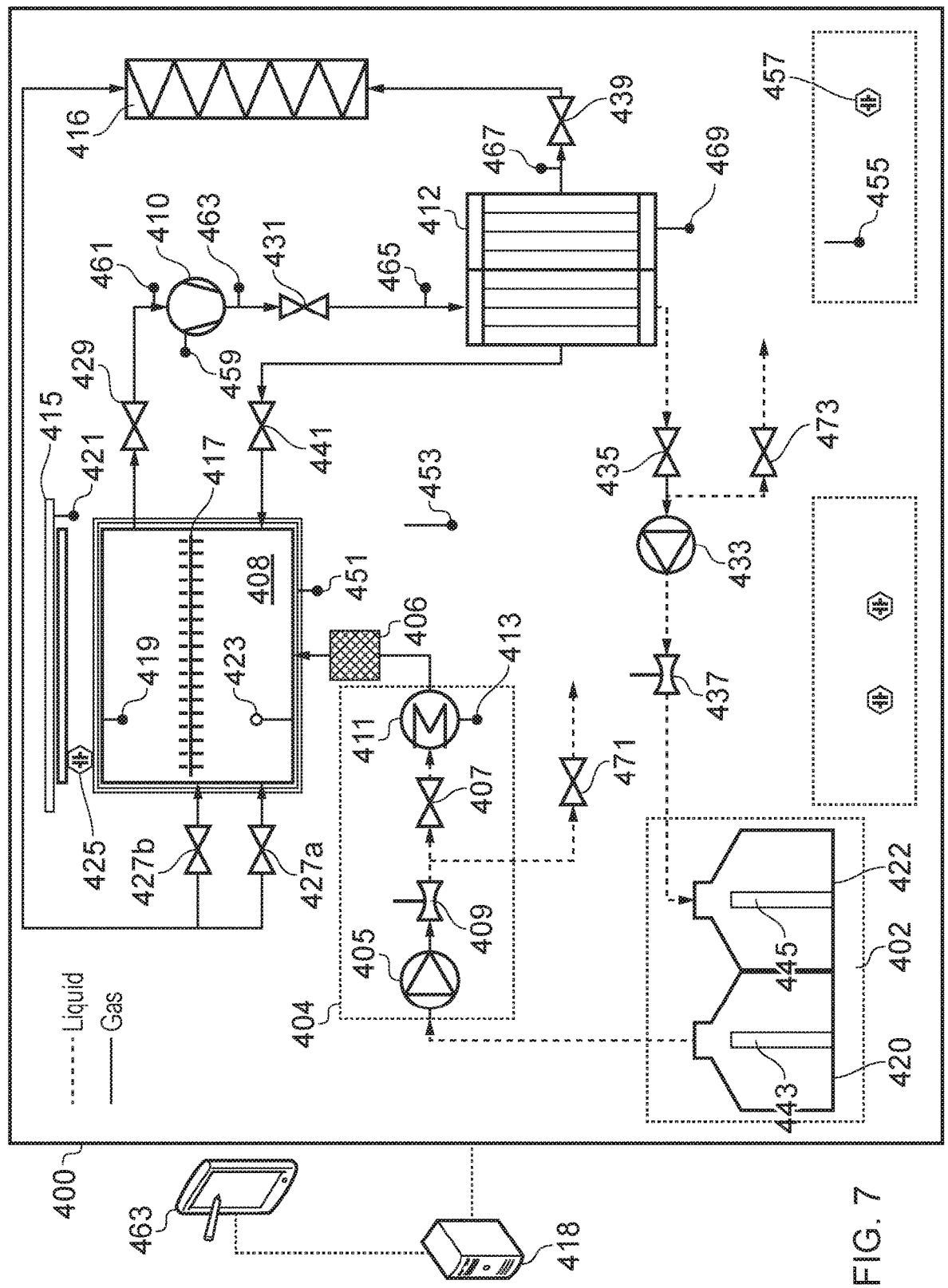
FIG. 7 illustrates a further schematic of an AM part post-processing apparatus according to certain embodiments of the present invention.

A further example according to certain embodiments of the present invention will now be described. As shown in FIG. 7, apparatus 400 for post-processing an AM part includes a removable reservoir 402, a solvent dosing and heating system 404, a solvent distribution system 406, an AM part processing chamber 408, a vacuum pump 410, and a solvent recovery system 412.

The solvent dosing and heating system 404 includes a peristatic pump 405 and a valve 407 to selectively deliver a predetermined amount/dose of solvent from the reservoir 402 to the processing chamber 408 via the solvent distribution system 406. The solvent dosing and heating system 404 further includes a solvent flow meter 409 and a heating element 411 in the form of a heating plate or coil. A thermocouple 413 is provided at the heating element 411 to monitor a temperature STI thereof. The solvent distribution system 406 ensures solvent vapour is distributed evenly across the chamber 408. It consists of at least one distribution channel with an aperture located, preferably centrally, within the process chamber 408. Aptly, one aperture is provided per approximately 30 litres of effective process chamber volume. For a process chamber having a volume of greater than around 30 litres, more apertures are desirable to ensure the process conditions for polymer components situated at different locations within the chamber are the same. For example, a process chamber 408 having an effective volume of around 90 litres would require at least three apertures distributing solvent vapour across the chamber.

Within the solvent dosing and heating system 404 between the peristatic pump 405 and the valve 407 there may be provided another valve 471 to extract a liquid solvent sample out of the machine 400 for testing purposes.

The processing chamber 408 includes a removable lid 415 and a part support system 417 for supporting one or more AM parts to be post-processed, such as a rack, hooks, frame, or the like. The inner walls of the processing chamber 408 are aptly heatable by a suitable heating element/s and a thermocouple 451 is provided to monitor a temperature CT1 thereof. The lid 415 is also aptly heatable by a suitable heating element/s and a thermocouple 421 is provided to monitor a temperature thereof. A pressure sensor 423 is provided to monitor a pressure inside the processing chamber 408 and a temperature sensor, e.g. a further thermocouple, 419 is provided to monitor a temperature therein. A switch/sensor 425 is also provided to sense a state of the lid relative to the processing chamber, i.e. open or closed.

Further thermocouples 453, 455, or the like, are provided inside and outside the apparatus to monitor internal and external ambient temperatures, and a humidity sensor 457 monitors ambient humidity. A pair of control valves 427a, 427b are provided between the processing chamber 408 and a stack of activated carbon filters 416 to allow the apparatus, particularly the processing chamber 408, to be selectively vented to atmosphere. One of the valves is to allow a relatively small vent to atmosphere whilst the other valve is to allow a relatively large, e.g. complete, vent to atmosphere. A second valve 429 is located between the processing chamber 408 and the vacuum pump 410 for selectively recovering solvent from the processing chamber 408.

Pump thermocouples 459, 461, 463 are also provided to monitor a temperature of the pump body and at the inlet and outlet thereof. A condenser valve 431 is provided between the vacuum pump 410 and the solvent recovery system 412 to isolate the vacuum pump for maintenance purposes. Condenser thermocouples 465, 467 are provided at the inlet and outlet of the solvent recovery system 412, and inside the condenser, and a pressure sensor 469 is also provided to monitor a pressure within the condenser.

A second peristatic pump 433 is provided between the solvent recovery system 412 and the solvent reservoir 402 for returning recovered solvent from the solvent recovery system 412 to the reservoir 402. A further control valve 435 is provided between the second peristatic pump 433 and the solvent recovery system 412 and a used solvent flow meter 437 is provided downstream of the pump 433. A further valve 473 is provided between the condenser 412 and the reservoir 402 to extract a sample of the recovered solvent for testing purposes.

A condenser air valve 439 is provided between the solvent recovery system 412 and the stack of filters 416. Furthermore, a chilled air valve 441 is provided between the solvent recovery system 416 and the processing chamber 408.

Optionally, a further control valve (not shown) may be located between solvent dosing and heating system 404 and the processing chamber 408. In this case, the solvent dosing and heating system 404 would act as a high pressure vessel able to preheat solvent in liquid or vapour phase to a particular temperature before releasing it into the processing chamber.

The apparatus 400 further includes a controller 418 having a user interface, e.g. a touchscreen display, to allow an operator to input predetermined parameters associated with the AM part to be post-processed, as will be described further below. An operator may interact with the controller either at the apparatus or remotely via a wired or wireless connection by using an application stored on a computing device 463 such as a tablet or mobile phone. The controller 418 is electrically connected to the controllable components of the apparatus 400 through a computer system such as a Raspberry Pi™ or other open or closed sourced system, to the systems and sensors of the apparatus 400 to allow the controller to automatically and selectively control the apparatus, whilst also receiving feedback signals during a post-processing operation, as described further below. The controller is also configured to record apparatus ambient operating conditions, namely ambient temperature and humidity while the apparatus is in use. The controller is aptly connected to an emergency stop switch/button (signal EM1-see table of FIG. 10) to immediately stop the machine should it be required. A sensor (signal AP1) may also be present to stop the apparatus 400 in the event of any maintenance access panels being removed during operation. The controller 418 may also be in read/write communication with a data storage medium, such as a cloud-based database, to allow operating parameters, programs and data to be accessed and/or stored. For illustrative purposes only, the flow of solvent in a liquid state during the postprocessing operation is shown by a dot-dashed line in FIG. 7 and the flow of solvent (or air) in a vapour state is shown by a relatively thick solid line in FIG. 7.

Figure 8:
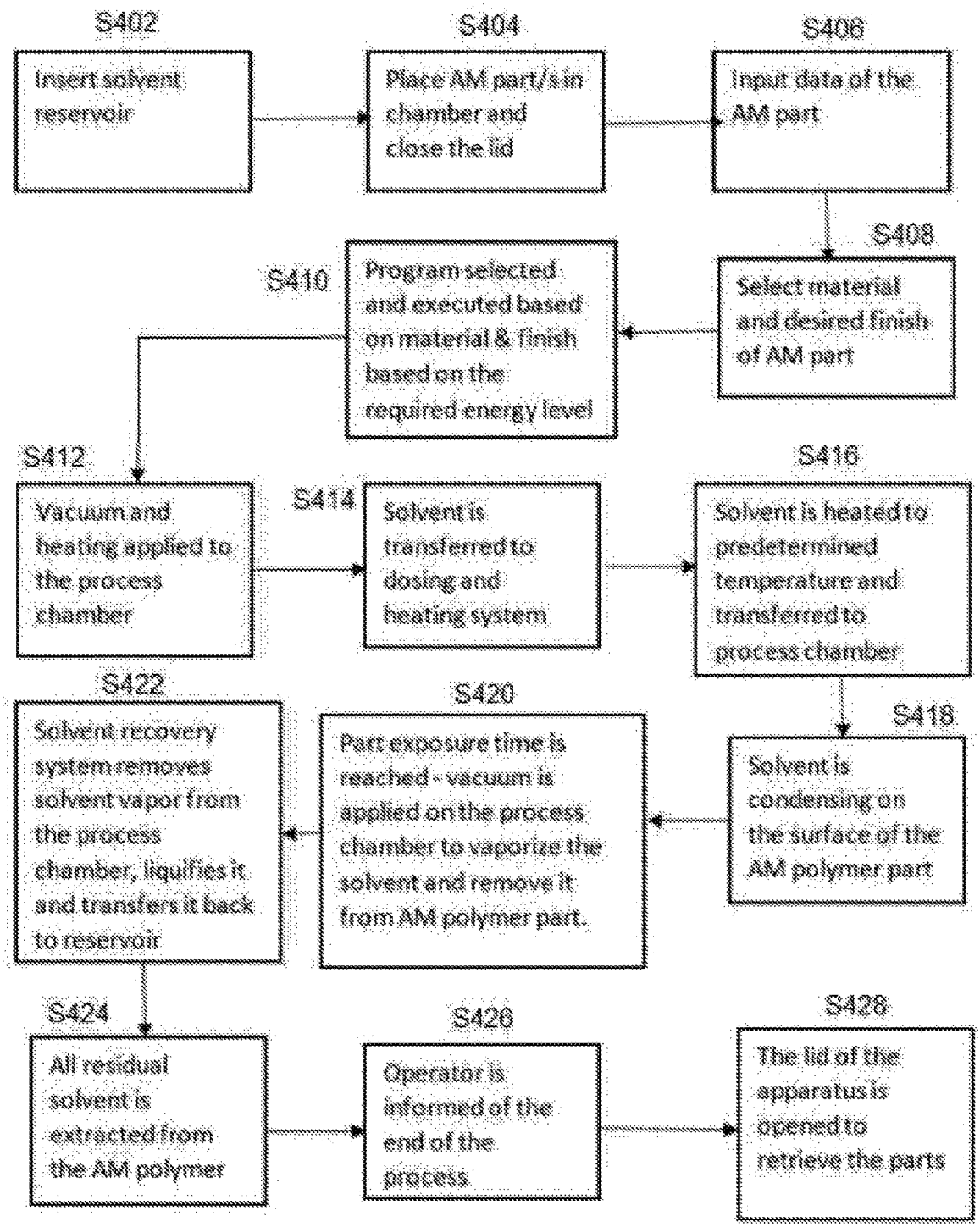
FIG. 8 illustrates the post-processing steps of a method using the apparatus of FIG. 7.

FIG. 8 illustrates a flow diagram showing the steps of a method of post-processing an AM part using the apparatus 400 as illustrated in FIG. 7 according to certain embodiments of the present invention.

As illustrated at step S402, a 'pre-packaged' and sealed reservoir 402 containing a suitable solvent is selected and removably coupled to the apparatus 400 via a suitable connection such as a quick release mechanism or the like. As shown in FIG. 7, the solvent reservoir 402 includes two compartments 420, 422; one for virgin solvent and another for used/recovered solvent. A level sensor 443 senses the virgin solvent level in the virgin solvent compartment and a level sensor 445 senses the used solvent level in the used solvent compartment. The virgin solvent compartment 420 has at least an outlet and the used solvent compartment has at least an inlet for returning used solvent to the cartridge, as described further below. The cartridge 402 includes a closed source electronics chip which communicates with the controller 418 to allow sensor signals to be operably sent thereto. The cartridge 402 also may include a quick release coupling handle mechanism for handling the cartridge when connecting to and removing from the apparatus. The handle mechanism may be coupled to the connection mechanism such that the handle mechanism actuates a quick connect/release coupling mechanism to quickly and easily couple/remove the cartridge to/from the apparatus. A sensor may be provided to confirm to the controller 418 that the cartridge is properly located and connected to the apparatus.

Suitable solvents include protonic polar solvent and non-proton polar solvents, such as, but not limited to, 1,1,1,3,3,3-hexafluoro-2-propanol (HFIP), dimethylformamide, sulphuric acid, m-cresol, formic acid, trifluoroacetic acid, and benzyl alcohol. Aptly a solvent that exhibits strong hydrogen bonding properties may be used. This property will allow the solvent to process substances that serve as hydrogen bond acceptors, such as Nylons™ (Polyamides). At step S404, at least one AM polymer part is placed in the processing chamber 408 via the access lid 415 and on to the part hooking structure 417 located in the chamber. The support structure 417 is configured to ensure the part is fully exposed to solvent introduced into the chamber. The access lid 415 is closed and the chamber 408 is sealed. A processing chamber door sensor 425 indicates that the lid is closed and the processing chamber is sealed. A corresponding signal L1 (see table of FIG. 10) from the lid sensor 425 indicating the lid is closed is detected by the controller 418.

Aptly, via the user interface of the controller 418, or automatically in response to the chamber 408 being sealed and/or a part being located therein, a systems check is run by the controller 418 to ensure the apparatus 400 is in a 'neutral' state and ready to post-process AM parts. The neutral state check ensures that all control valves are in the correct positions, the solvent cartridge contains a sufficient amount of virgin solvent and has been correctly coupled to the apparatus, and the process chamber door/lid is securely closed.

At S406, a user inputs information relating to the AM part to be post-processed into the controller 418. The information includes, but is not limited to, material, surface area, volume, geometry, complexity and/or orientation/position within the processing chamber. The part material may be selected from a non-exhaustive list of materials including Nylon 12 (PA220 Duraform™ PA), Nylon 11 (Duraform™ EX Natural, Duraform™ EX Black), Thermoplastic Polyurethane (TPU), TPE-210 elastomer materials, Acrylonitrile butadiene styrene (ABS), Acrylonitrile styrene acrylate (ASA), or the like. Other polymers which can be processed using an apparatus and method according to certain embodiments of the present invention include Polyamide 6, Polyamide 11, Polyamide 12, Polycarbonate (PC), Polypropylene (PP), Polyvinylidene fluoride (PVDF), Polyphenylene sulfide (PPS), Polyether ether ketone (PEEK), Ethylene propylene rubber (EDPM), Nitrile rubber (NBR), Thermoplastic elastometers (TPE), ULTEM™ 9085, ULTEM™ 1010, or the like. Selecting the part material from a pre-stored list of materials ensures repeatability and reproducibility of the process.

At S408, via the user interface of the controller 418, the user selects the desired surface finish, e.g. smoothness/roughness, which, together with input parameters from step S406, determines the required processing program to be selected and run by the controller (see table of FIG. 11). The surface roughness may be selected from a range of around 1.0μη to the 'as printed' surface roughness (i.e. no smoothing). Alternatively, a surface finish may be selected based on finish descriptions, e.g. matt or gloss, and/or visual examples displayed on the display of the user interface or mobile computing device.

At step S410, the processing program is selected by the controller 418 in response to the selected part material and desired surface roughness and is then executed. The processing programs are defined according to the required levels of energy to be equalised to process particular materials (see table of FIG. 11, and graphs of FIGS. 13 and 14), as described further below. The energy to be equalised depends on the solvent, the material, the desired smoothness, and in turn the required temperature differences between the material and the solvent. The higher the temperature difference, the higher the energy to be equalised. For example, for Polyamide 12 the minimum amount of energy to be equalised should be: $E_q=k \times (TH-TM)/TH=k \times (21-15)/21=0.3k$, whereas for Thermoplastic polyurethane (TPU) at least: $E_q=k \times (TH-TM)/TH=k \times [39-(-20)]/39=1.5k$, where k is coefficient representing heat transfer of different polymers, TH is the temperature of HFIP vapour and TM is the temperature of the polymer to be processed. The higher values will result in a different degree of surface processing, which when combined with processing time can produce varying levels of surface finish (see FIG. 12. The Eq levels have been described relatively in the table of FIG. 12 as 'low' and 'high' for each material, i.e. Eq which is 'low' for TPU, would be 'high' for Polyamide 12, whereas Eq which is 'low' for Polyamide 12 would not be suitable for processing TPU). TM values were derived by the applicant and are provided in FIG. 11. TH values depend on the process conditions derived by the applicant as tabulated in FIG. 11 and are derived accordingly from the Pressure-Temperature graph of the specific solvent (e.g. FIG. 15 for the HFIP solvent).

Figure 13:
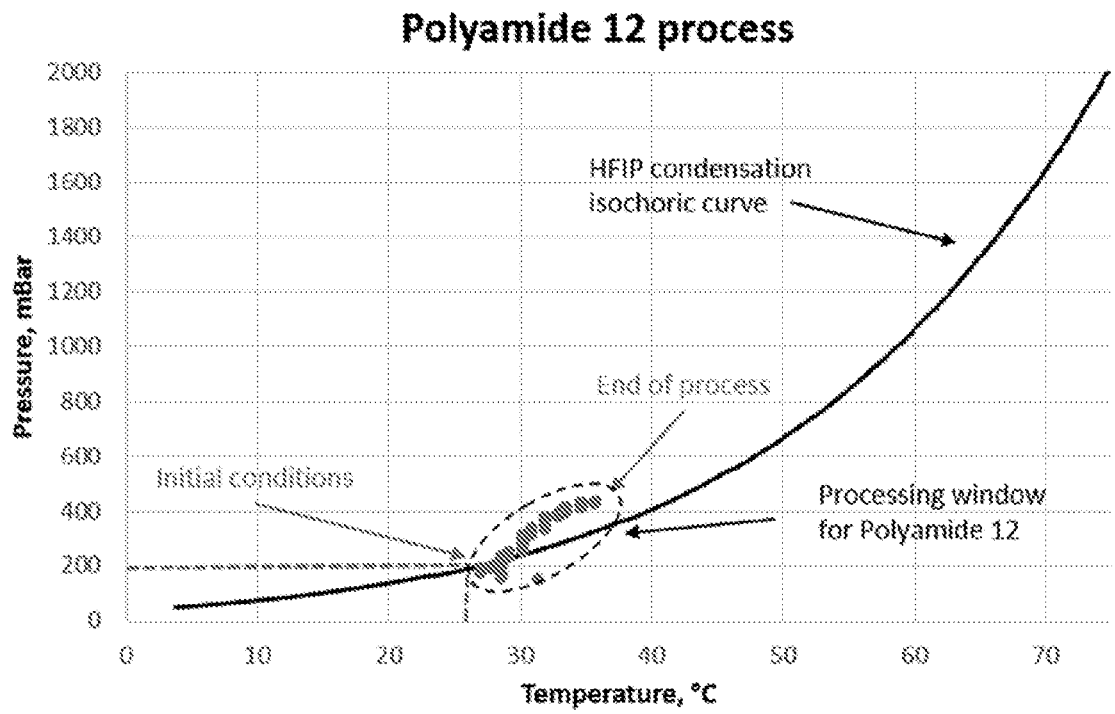
FIG. 13 illustrates processing data for Polyamide 12.
Figure 14:
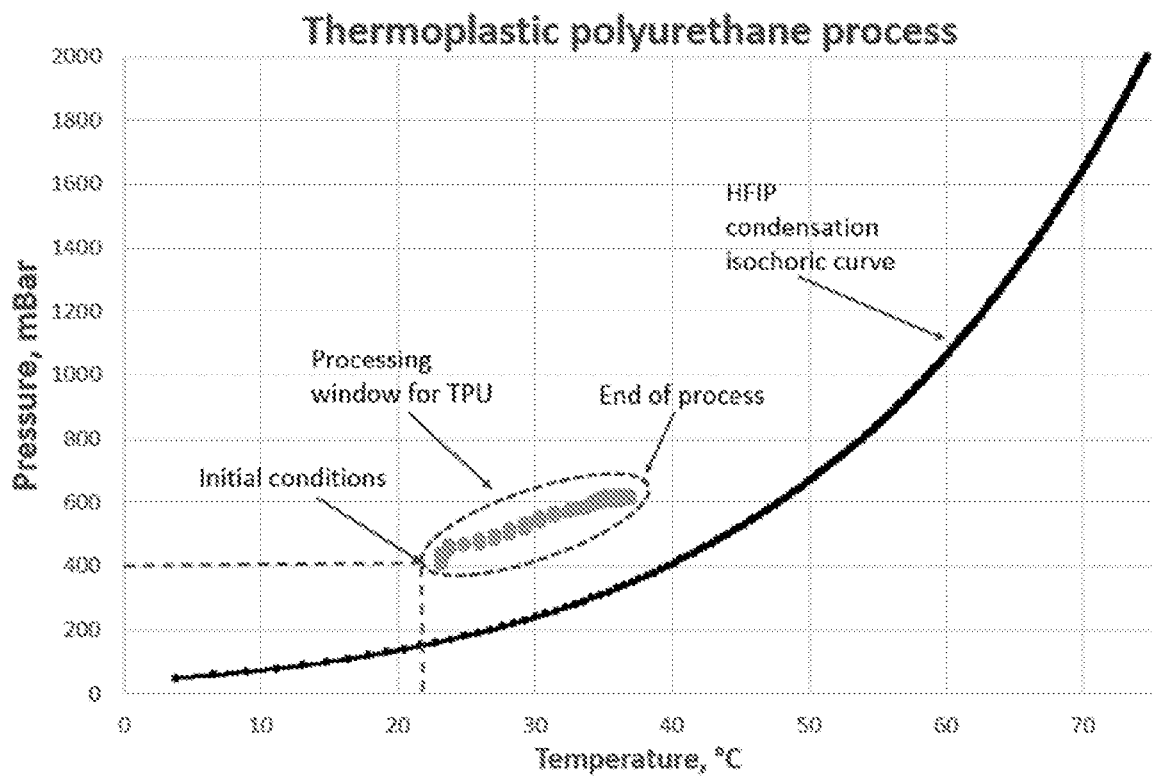
FIG. 14 illustrates processing data for Thermoplastic polyurethane.
Figure 15:
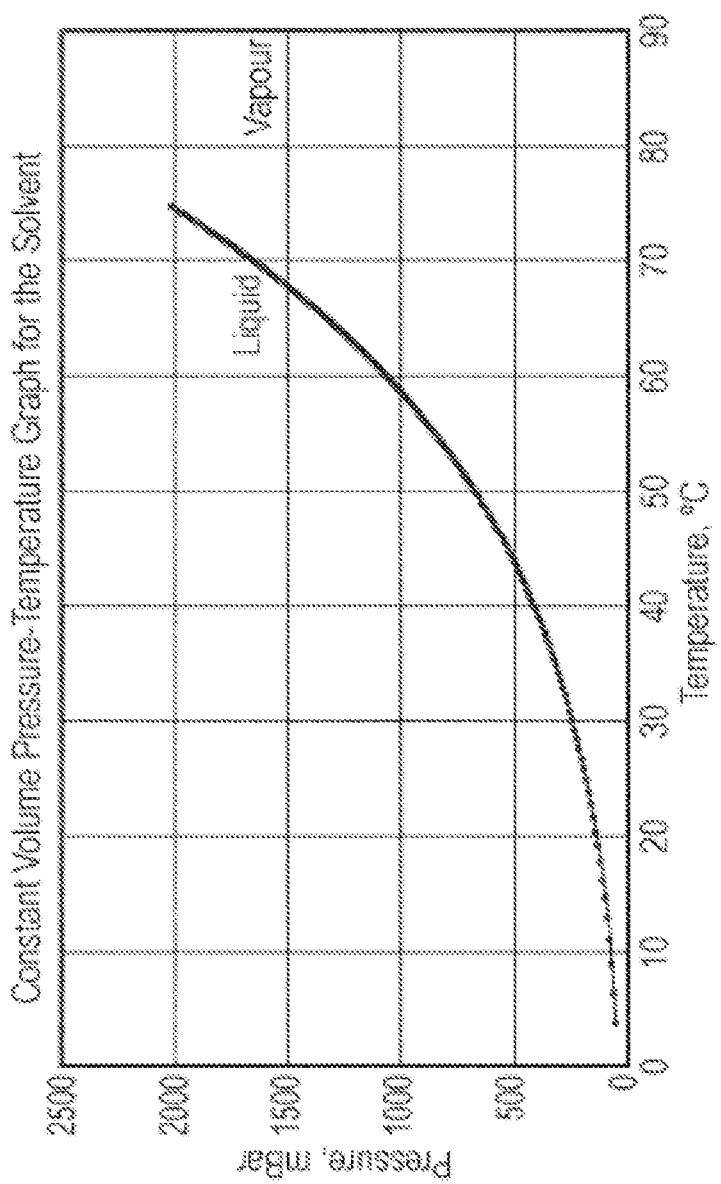
FIG. 15 illustrates a pressure-temperature graph of the HFIP solvent for adjusting processing parameters to smooth the surfaces of the AM polymer part.

At step S412, the vacuum pump 410 is used to reduce the pressure within the processing chamber 408, and the chamber wall heaters 403 preheat inner walls of the chamber to a predefined temperature. The pressure and temperature of the processing chamber 408 are based on the AM polymer part to be processed (see table of FIG. 11). FIGS. 13 and 14 show the solvent-specific thermodynamic relationships for Polyamide 12 and Thermoplastic Polyurethane respectively.

At step S414, the solvent dosing valve 407 of the solvent dosing and heating system 404 is opened by the controller 418 and a predetermined amount/dose of solvent (see table of FIG. 11) is transferred from the reservoir 402 to the heating element 411 within the solvent dosing/heating system 404 using the solvent dosing pump 405 at a controlled solvent pump dosing speed SDs (see table of FIG. 10). The solvent quantity is calculated as a function of the type of solvent being used, the volume of the processing chamber 108, the surface area of the part/s, and the material of the parts (see table of FIG. 11). For example, if the processing chamber 408 is filled with Polyamide 12 components with overall surface area of 1000 cm², then the amount of HFIP solvent required will be 0.08 ml/cm²×1000 cm²=80 ml (see table of FIG. 11 for the quantity multiplier for the HFIP solvent, which will vary depending on the type of the solvent used).

At step 416, the solvent within the solvent dosing/heating system 404 is then heated (provided with energy) to a predetermined temperature St1 (see table of FIG. 10). The amount of energy (heat) provided to the solvent depends on the thermodynamic conditions of the process, which in turn is dictated by the type of polymer to be processed (see tables of FIGS. 10 and 11). As explained in FIGS. 13, 14, 15 and 17, the solvent has to follow a particular thermodynamic path and condense on the polymer under specific conditions for the surface of the polymer to process. The solvent temperature St1 in the solvent dosing/heating system 404 may be between room temperature and 100° C. depending on the type of solvent to be used for the AM part being processed (see FIG. 9 showing the thermodynamic graph for the HFIP solvent). Some solvents may not require heating. As a result, the solvent is turned into vapour state and is delivered into the processing chamber 408 via the solvent distribution system 406.

The solvent distribution system 406 includes at least one distribution channel having a at least one aperture located preferably centrally in the chamber to ensure even and rapid introduction of the solvent vapour therein. As described above, the number of apertures located across the chamber depends on the size of the chamber, with larger chambers requiring more apertures to ensure solvent vapour covers all polymer parts located therein uniformly. It was determined by the applicant that one centrally located aperture is sufficient to uniformly distribute solvent vapour across a processing chamber having a volume of around 30 litres.

Alternatively, the cartridge 402 itself may be heated by a separate or integral heating means, such as an electrical heating element disposed in the cartridge, to elevate the temperature of the solvent therein to the predetermined temperature St1. In such an embodiment, the solvent dosing/heating system 404 may not be required and the solvent may be introduced into the processing chamber 408 directly from the cartridge via the solvent distribution system 406.

Figure 16:
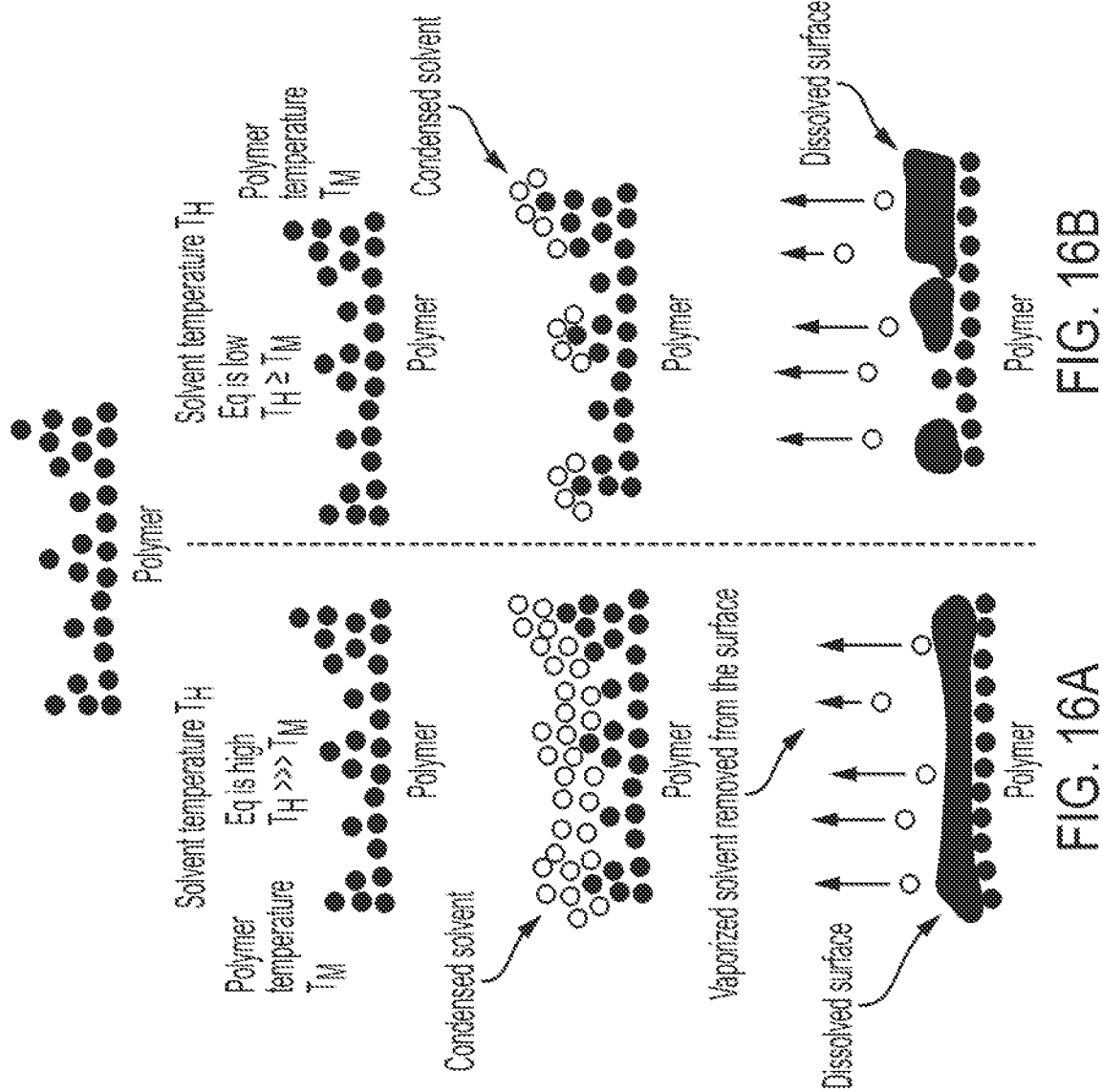
FIGS. 16A and 16B illustrate the process of creating different levels of surface smoothness by controlling the energy potential between the solvent and the AM part in accordance with certain embodiments of the present invention.

Another alternative may be a pressure expansion type of device where the solvent dosing/heating system 404 is isolated by the valves from both the reservoir 402 and the processing chamber 408. In this case, the solvent dosing/heating system 404 becomes a high-pressure vessel where the solvent is heated until it reaches vapor state, then the vapor is superheated and is further provided with energy that in turn increases the pressure within the solvent dosing/heating system 404. A valve separating the solvent dosing/heating system 404 and the processing chamber 408 is then opened and the pressure difference between the solvent dosing/heating system 404 with superheated vapor and the processing chamber 408 drives the vapor into the processing chamber 408. As a result, the apparatus allows for the combination of the pre-heated solvent vapour and the higher or lower pressure in the processing chamber 108 to be achieved. The temperature of the AM polymer material may also be selectively controlled by pre-cooling using chilled air, or the like, delivered into the processing chamber 408 from, for example, the condenser/solvent recovery system 412 and via the control valve 441 located therebetween. This in turn allows various energy level differences (i.e. temperature gradients) to be achieved between the solvent vapour and the AM polymer part for different AM polymer parts, as shown in FIGS. 16A-B 16a & 16b. These figures illustrate the process to create various levels of surface smoothness by controlling the available energy to be equilibrated $E_q$, when a) $E_q$ is set to be relatively high by increasing the temperature of the solvent vapour TH and reducing the temperature of the AM polymer part to be processed TM; and b) when $E_q$ is set to be relatively low. In the case when $E_q$ is relatively high, more solvent will rapidly condense on the surface of the part which will result in more dissolution on the material surface and therefore a smoother surface. In comparison, when $E_q$ is relatively low, less solvent will condense on the material surface which will lead to less dissolution and a less smooth surface.

After the solvent vapor is introduced into the processing chamber 408, the AM part/s located therein are fully surrounded by solvent vapour. The dosing quantity is controlled by the solvent dosing/heating system 404 and is determined according to the processing requirements of the particular AM polymer part and/or as the amount of solvent required to fully saturate the vapour phase. In the latter case, this is governed by the vapour-liquid equilibria (e.g. see FIG. 15 for the HFIP vapour-liquid graph) of the specific solvent in relation to the temperature and pressure of the vapour and liquid phases.

Figure 17:
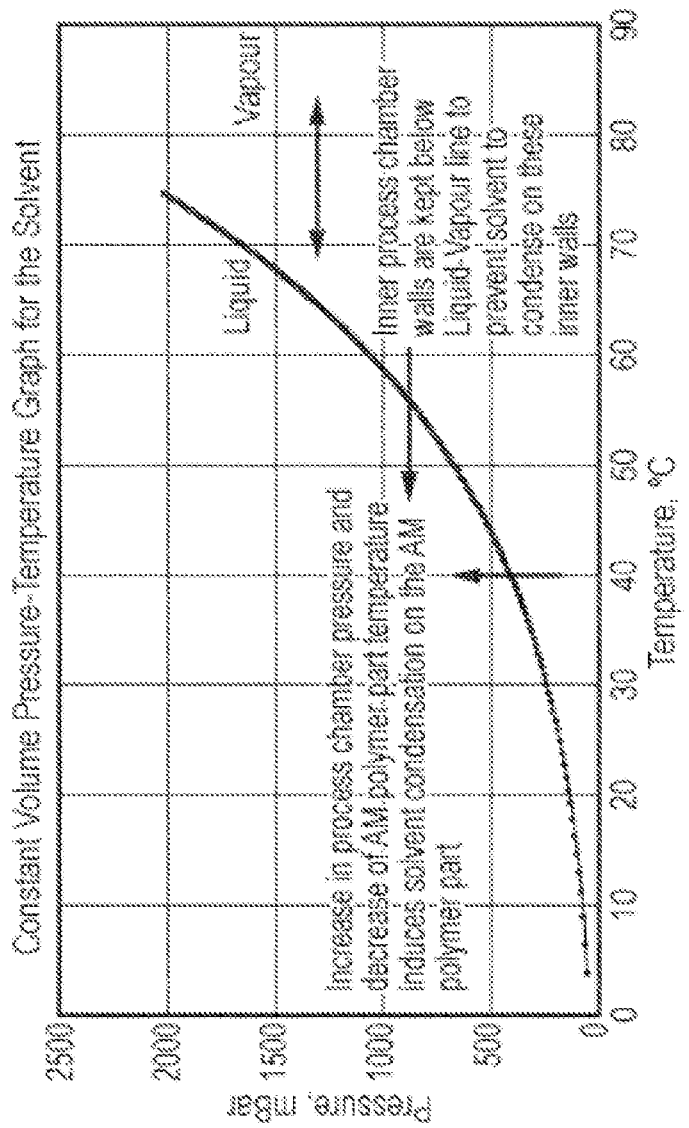
FIG. 17 illustrates the control of solvent state during the smoothing process.

At step 418, the solvent starts to condense on the AM polymer part located in the processing chamber 408. The condensation is triggered due to the pressure and/or temperature conditions and the resulting vapour oversaturation governed by the vapor-liquid equilibrium line for the particular solvent (see FIG. 15). This is manipulated by various methods: lowering the temperature within the processing chamber 408 using the chamber heater 403; increasing the pressure by introducing more solvent vapor into the processing chamber 408 via the solvent dosing/heating system 404 or opening the vent-to-air valves 427a,b (see FIGS. 13,14 and 17). FIG. 17 illustrates the processing effects of controlling the pressure and temperature of the solvent in the processing chamber 408 and on the AM part/s.

Figure 18A:
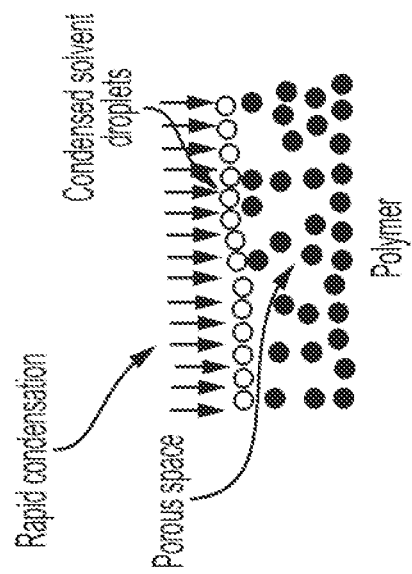
FIGS. 18A and 18B illustrate the effects of rapid condensation of solvent on an AM part in accordance with certain embodiments of the present invention.
Figure 18B:
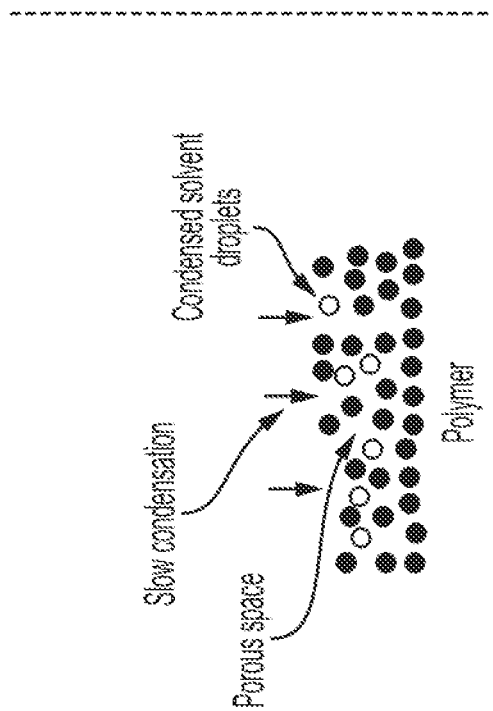

For example, HFIP solvent in vapor state condenses on the polymer part quickly enough to form a boundary layer on top of the surface. FIG. 18A illustrates the absorption of the condensed solvent droplets into the porous polymer matrix caused by the capillary pressures of the pores, which undesirably occurs under standard conditions by conventional methods; and FIG. 18B illustrates condensed solvent droplets rapidly accumulating on the surface of the porous polymer faster than absorption can take place, which is desirably achieved in accordance with certain embodiments of the present invention.

At this stage the grains in the upper layer of the polymer part are dissolved and redistributed to form a smooth surface (see FIGS. 16A-B). The amount of condensed solvent per unit of time depends on the level of energy $E_q$ to be equilibrated between the polymer and the solvent vapour. More solvent condensed per unit of time will result in bigger dissolution of the outer layer of the polymer part, hence a smoother surface; and, in contrast, a lower amount of solvent condensation on the surface will dissolve less of the surface which in turn means a less smooth surface finish. Thermodynamic conditions in the processing chamber 408 for the optimum energy to be equilibrated $E_q$ were derived by the applicant and vary for different polymers (see tables of FIGS. 11 and 12 and the graphs of FIGS. 13 and 14). Condensation may also be triggered by the addition of inert gasses using additional storing chambers for those gasses to increase the pressure or addition of cooled air to reduce the temperature. To avoid condensation on the inner walls of the processing chamber 408, the temperature of these walls is controlled to be just above the condensation line of the solvent (see FIGS. 15 and 17). As a result, the condensation of solvent vapor desirably occurs only on the AM polymer part/s.

The condensed liquid solvent film is maintained on the AM part/s for a predetermined part exposure time PETi, which can range from around 5 seconds for Nylon 12 parts to around 10 minutes for TPU type parts (see table of FIG. 12). The predetermined part exposure time PETi and the level of the energy to be equilibrated Eq, determines the final surface roughness of the part/s and can be controlled to around 1.0μmτι (see table of FIG. 12 and FIGS. 16A-B).

The rest of the processing chamber 408 is kept above the condensation point of the solvent to ensure the solvent condenses only on the part. For example, FIGS. 13 and 14 represent the process for Polyamide 12 (Nylon 12) and TPU materials respectively in terms of pressure-temperature conditions within the processing chamber.

At step 420 once the predetermined part exposure time PETi for the part/s being processed has been reached, the part smoothing process is complete. The time required to achieve various levels of surface finish in accordance with certain embodiments of the present invention can be seen in the table of FIG. 12. FIG. 3 illustrates the relationship between surface roughness and exposure time according to certain embodiments of the present invention.

Figure 19A:
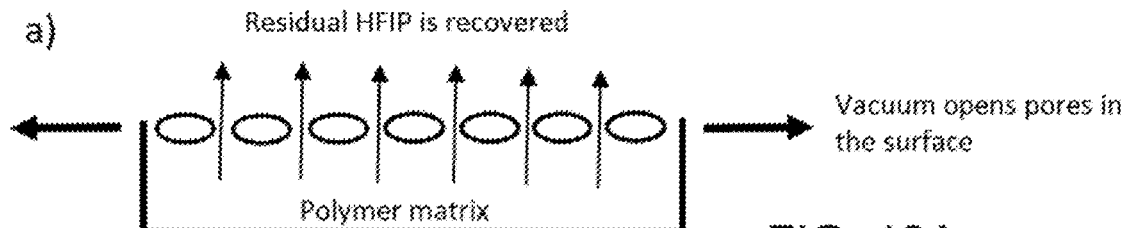
FIGS. 19A and 19B illustrate removal of residual solvent from an AM part in accordance with certain embodiments of the present invention.
Figure 19B:
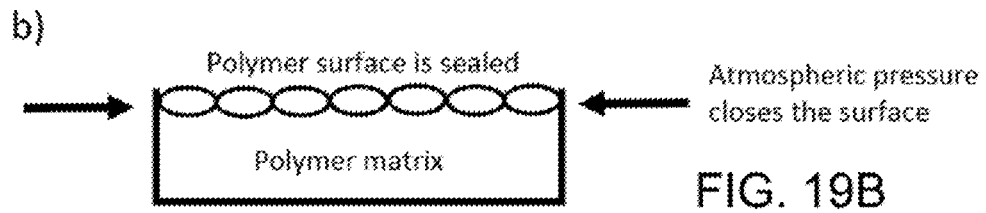

Vacuum pump 410 then applies a negative pressure VP1 of around 10-200 mbar to the processing chamber 408 for a predetermined time VT1. The reapplication of a negative pressure to the processing chamber 108 increases vapour pressure to return the condensed solvent from a liquid state to a vapour state. This is done to dry the processed part and recover any excess solvent (see FIGS. 19A-B). At step S422, the valve 429 between vacuum pump 410 and the solvent recovery system 412 is opened and the solvent vapor is fully removed from the processing chamber 408 through the solvent recovery system 412 where the solvent is collected in a liquid form and transferred to the recovered solvent compartment 422 of the reservoir 402 by the peristatic pump 433. Solvent recovery system 412 may comprise a condenser with at least one column, or the like.

The apparatus 400 therefore forms a closed loop. The solvent is used until a maximum surface area processed has been reached, before being recovered and sent to the used/recovered solvent compartment 422 of the reservoir 402 for safe disposal. Before the reservoir 402 reaches its end of useful life and needs replacing, an electronic chip, which is configured to monitor how often solvent is recycled through the reservoir, will automatically communicate with the controller 418 such that a new reservoir is automatically or manually ordered for delivery. The used reservoir is removed and a new reservoir containing 'fresh' solvent is inserted for the next operation.

The carbon filter/s 416 is present on the external atmosphere manifold to ensure no solvent vapour is released into the atmosphere. No residual vapour remains on the surface of the part/s, no residual trace is left, and in turn the post-processing of the part/s is immediately stopped. This not only ensures the process is fully controlled, but also some applications, such as for medical or dental devices, require the parts to be fully clean and safe to use, and also to possess a particularly accurate surface roughness which would not be achievable if any further processing of the part occurred as a result of any remaining solvent residue on the surfaces of the part.

A solvent sensor (not shown) may be located in the processing chamber 408 to sense the presence of solvent vapour therein and send a signal to the controller 418 indicating whether or not solvent exists in the chamber 408. At step S424, the extraction/drying step is repeated until no solvent (Volatile Organic Compounds-VOCs) is detected within the processing chamber 408 by the solvent sensor SSi located therein. At step S426, in response to signal SSi indicating no solvent vapour remains in the processing chamber 408, the controller 418 stops the vacuum pump 410 and closes the valve 429 between the processing chamber 408 and the vacuum pump 410. The processing program ends and the operator is notified by an audible and/or visual indication. At step S428, the access door/lid 415 of the apparatus 400 may be opened to retrieve the post-processed AM polymer part/s from the processing chamber 408. The process is repeated as desired.

For each operation, the controller 418 monitors and logs all the operating variables as indicated in the tables of FIGS. 9 and 10 and uploads them to a read/write database stored on a web-based server or the like. In use, a set of predetermined algorithms defining the various relationships between the operating parameters are selected and used to control the post-processing of an AM part based on its material, volume, surface area, geometry, and the desired finish, as outlined above.

An example according to certain embodiments of the present invention is now described. Information on the AM part/s to be post-processed is loaded into the controller 118, 418 where the following parameters are acquired:

Volume of each part—$V_p$
Surface Area of each part—$A_p$
Max height, width and length of each part—to calculate the 'bounding box' volume $V_b$—L, W, H
From these parameters the following values are calculated:
$V_p$
Part volume ratio $(C_{PR})=1-$
Volume of part=$V_p$
Volume of bounding box=$V_b$
Area Ratio $(C_{AR})=1-$
Ap
Surface of imaginery sphere=$A_s=$
$(4\pi)^{1/3}(3Vp)^{2/3}$
Thickness Ratio=$C_T n=1-^{mm}$
'max
Tmin¯Minimum Thickness of part $T_{max}$–Maximum Thickness of part
The complexity factor $C_F$ is thus calculated as follows:
$C_F=C_{CTR}+C_{AR}+0.1C_{PR}$ The required surface roughness is input into the controller along with the part material type. The controller calculates the required part exposure time PET1 in accordance with the relationship between surface roughness and time shown in FIG. 3. 5B-0.4371Λ For example, for Nylon 12 this relationship follows the relationship T=ev-»«5λ Therefore, to achieve a specific surface roughness of 5 microns, the process PET1 is calculated as follows: 5–0.4371Λ

$T=e-1965^{)}=3.7$ seconds

This is then multiplied by the complexity factor $C_F$ to give the PET1. For the processing of moderately complex parts this would generate a $C_F$ of around 2.1 which would give a total processing time of 7.8 seconds. Overall the process can be described by the corresponding energy level $E_q$, values for which were derived by the applicant and provided in the FIG. 12.

Depending on the AM polymer material type, the maximum energy $E_q$ to be equilibrated between the HFIP TH and the polymer material™ can be derived from equation $E_q=k\times(TH-TM)/TH$, where k is coefficient representing heat transfer of different polymers, TH is the temperature of HFIP vapour and TM is the temperature of the polymer to be processed. Relatively high $E_q$ results in rapid condensation of solvent vapour on the AM polymer part and glossy surface finish, whereas relatively low $E_q$ results in slower condensation speed and a matt surface finish (see FIGS. 16A-B). The predetermined algorithms are used by the controller to automatically control the key variables of the automated process to achieve the user's desired surface finish. It has been shown that apparatus according to certain embodiments of the present invention having a processing chamber 408 of around 400 mm high, around 400 mm deep and around 600 mm wide can enable batch processing of an AM polymer part having dimensions of about around 31×31×53 mm in approximately 20 seconds and thus processing of around 50 parts in around 12 minutes which is over 100 times quicker than the traditional, manual methods for post-processing an AM polymer part.

Figures 22, 23:
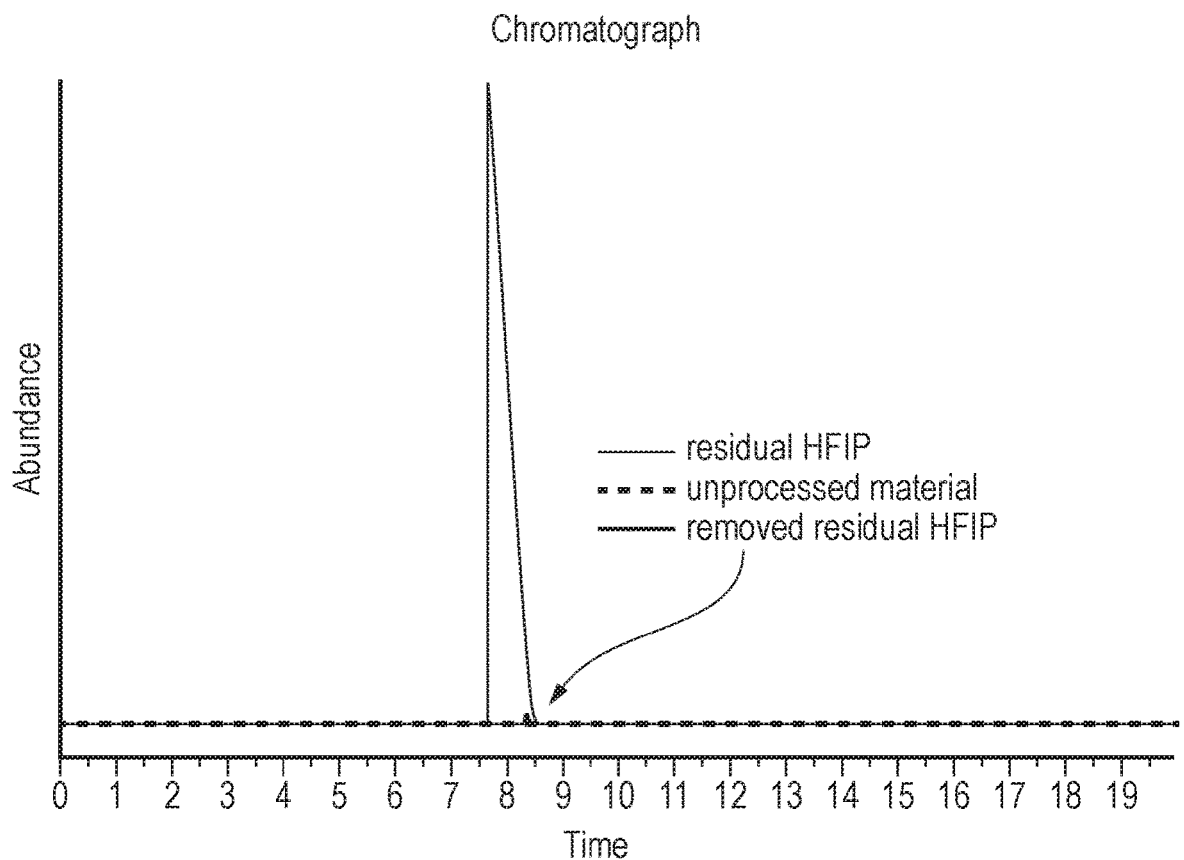
FIG. 22 illustrates a chromatograph showing the efficiency of HFIP solvent recovery from a processed polymer in accordance with certain embodiments of the present invention.
FIG. 23 illustrates residual HFIP removal conditions in accordance with certain embodiments of the present invention.

As a further example, the post-processing method according to certain embodiments of the present invention comprises selectively releasing a predetermined amount of 1, 1, 1, 3,3,3-Hexafluoro-2-propanol (HFIP) solvent into the processing chamber using positive or negative pressure. The amount of HFIP solvent required depends on the type and number of AM polymer parts to be processed. The method comprises providing solvent predetermined amount of energy and heating it to a specific temperature, which causes the solvent to vaporise prior to entering the processing chamber. The apparatus and method according to certain embodiments of the present invention are configured to create an energy (heat) potential between the AM polymer part and the HFIP solvent: the solvent is provided with a particular amount of energy and is vaporised, whereas the AM polymer part may be pre-cooled to a particular temperature so that there is an energy difference (entropy) between the solvent vapour and the AM polymer part. Liquid HFIP is turned into a vapor and then is rapidly condensed on the surface of the polymer material. Due to the energy difference between the solvent vapour and the AM polymer part, the polymer material is not fast enough to absorb the solvent condensate droplets within its matrix, instead solvent condensate droplets accumulate on the upper layer of the polymer. At this stage the polymer grains in the upper layer are dissolved and redistributed to form a smooth boundary layer. As a result, the material particles coalesce and the upper layer is sealed, preventing solvent intrusion/absorption deeper into the polymer matrix. Thermodynamic energy conditions for enough condensate to be created on the part surface vary for different AM polymers. This particle surface sealing effect may in turn have further applications in water-sealing applications. The condensation speed is aptly increased relative to condensation under standard conditions to ensure the polymer surface is processed. The reason for this is the porous structure of the polymer surface, which results in the gradual absorption of the condensate droplets, i.e. sponge-water absorbing behaviour. This is especially the case for the elastomers such as Thermoplastic Polyurethane (TPU). Due to this adsorption phenomena rather than accumulating on the surface of the polymer, solvent would normally be absorbed within the polymer matrix. However, by increasing condensation speed the porous polymer is not able to absorb condensation droplets fast enough, as a result the condensation droplets accumulate on the surface of the polymer rather than be absorbed, which in turn dissolves and smoothens the surface of the AM polymer part. In the closed system (processing chamber) the availability of energy to be equilibrized during the process has to be increased, i.e. the entropy of the system reduced. This in turn increases the condensation speed. The maximum energy $E_q$ to be equilibrated between the HFIP TH and the polymer material™ can be derived from equation $E_q=k\times(TH-TM)/TH$, where k is coefficient representing heat transfer of different polymers, TH is the temperature of HFIP vapour and TM is the temperature of the polymer to be processed. To achieve the required equilibration energy level in the system, the temperature of the HFIP is increased using in-built heating system, whereas the polymer materials may be cooled using either in-built or external blast-freezing system. Pressure within the chamber is also manipulated to help achieve the required difference in the energy to be equilibrated. There is a threshold level for the energy equilibration for different polymers to be processed. For example for the Polyamide 12 the minimum amount of Energy to be equalised should be at least: $E_Q=k\times(TH-TM)/TH=k\times([(-1)\times 21]-25)/21=0.2k$, whereas for the Thermoplastic polyurethane at least: $E_Q=k\times(TH-TM)/TH=k\times[39-(-20)]/39=1.5k$. TM values were derived by the applicant and are provided in FIG. 11. TH values depend on the process conditions derived by the applicant as tabulated in FIG. 11 and are derived accordingly from the Pressure-Temperature graph of the specific solvent (e.g. FIG. 15 for the HFIP solvent). The processing chamber walls are aptly kept above the HFIP condensation conditions to ensure the condensation happens preferentially on the polymer parts instead of the chamber itself. Once processing is finished the HFIP is converted back into the vapor phase to remove it from the polymer. A vacuum is applied to help residual solvent be removed from the processed polymer. The amount of HFIP getting into the matrix of the polymer material is minimized by fast condensation process. As a result, the polymer grains in the upper surface coalesce and act as a sealing boundary layer. During the last stage of processing the venting is turned on and the chamber temperature and pressure are adjusted to ensure any residual solvent inside the polymer matrix is recovered (see FIGS. 22 and 23). FIG. 22 illustrates thermogravimetric results of the processed polymer material, indicating the presence of residual HFIP and the temperature at which it can be recovered. FIG. 23 illustrates a chromatograph showing the efficiency of recovery of the HFIP from the processed polymer. The solid grey line represents the amount of leftover HFIP in the processed polymer that has not undergone solvent removal procedure, whereas the solid black line indicates the amount of leftover HFIP in the processed polymer sample that has undergone solvent removal procedure. The dashed black line is provided for reference and shows amount of leftover HFIP in non-processed polymer sample. This ensures there is no unwanted weight gain or residual chemicals in the AM polymer part.

Thermogravimetric analysis and chromatography experiments were carried out to find the most effective processing chamber temperature-vacuum parameter combination that recovers residual solvent (see table of FIG. 24).

There is therefore provided the use of 1,1,1,3,3,3-Hexafluoro-2-propanol (HFIP) condensate to process the surface of additively manufactured (AM) polymers by the manipulation of thermodynamic system and the energy levels of the HFIP and the polymer. Apparatus in accordance with certain embodiments of the present invention is configured to manipulate the thermodynamic system and create favourable energy conditions for the AM polymers to be smoothed. The apparatus and processing method are configured to treat the surface of several polymer parts manufactured by additive manufacturing methods (e.g. 3D printing). The surface of treated polymers becomes smoother compared to non-treated surfaces and, in particular, the smoothness level can be controlled with a set of predefined parameters as described herein. HFIP condensate treats the surface of the polymer material in the quick process which is achieved by maximizing the energy to be equilibrated (entropy) between HFIP and the polymer, i.e. heating up the HFIP while cooling polymer material. In accordance with certain embodiments of the present invention, a new use of HFIP is provided by treating the surface of the polymers, particularly TPU, by HFIP condensation on the polymer through control of available equilibration energy between HFIP and the polymer material. The apparatus according to certain embodiments of the present invention is configured to process any polymer part made from a 3D printing/additive manufacturing process. For example, the apparatus is able to process parts created from multiple polymer groups such as Nylon 12 (PA220 Duraform™ PA), Nylon 11 (Duraform™ EX Natural, Duraform™ EX Black), Thermoplastic Polyurethane (TPU), and TPE-210 elastomer materials, or the like. In addition, the apparatus is able to process other polymer materials such as ABS. An AM part made by fused deposition modelling (FDM), laser sintering (LS), and high speed sintering (HSS) and multi-jet fusion can be finished using the apparatus and method according to certain embodiments of the present invention.

Figure 20A:
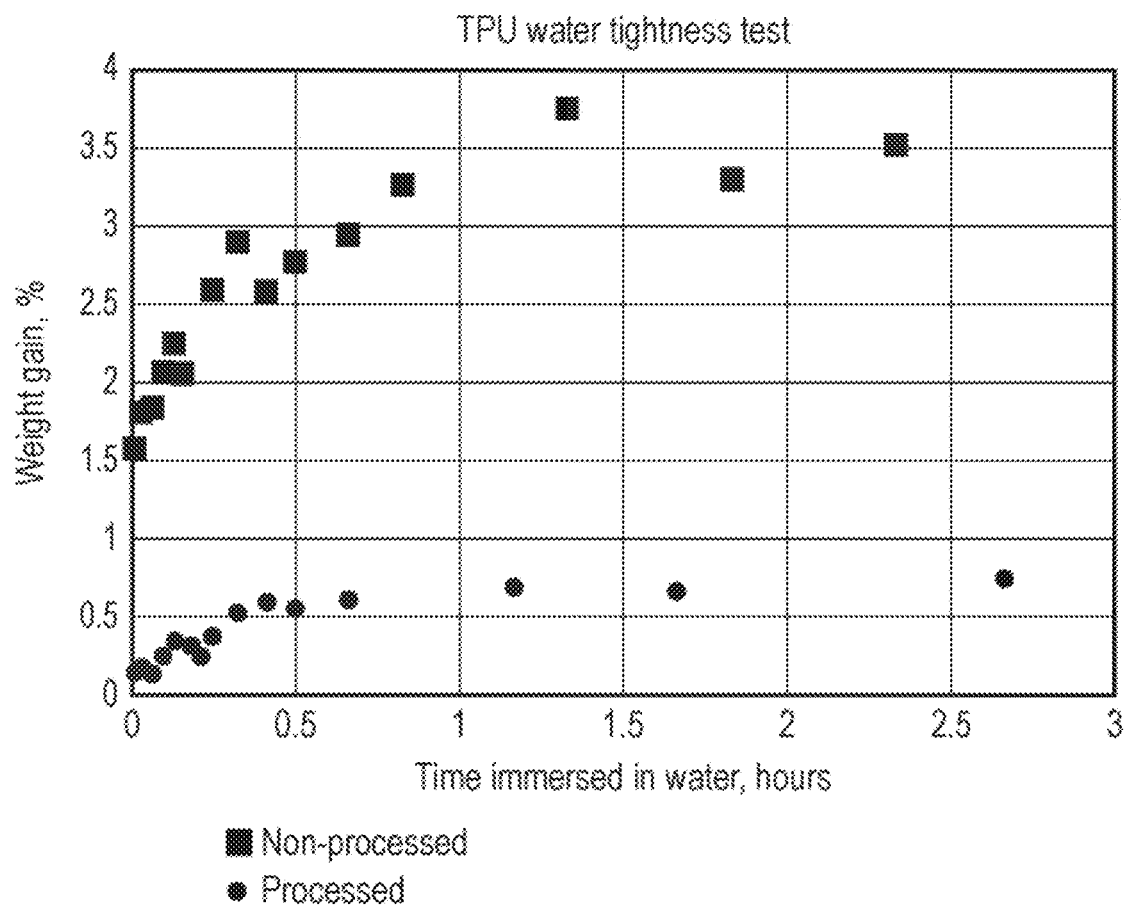
FIGS. 20A and 20B illustrate water immersion test results for TPU and Polyamide 12 parts processed in accordance with certain embodiments of the present invention.
Figure 20B:
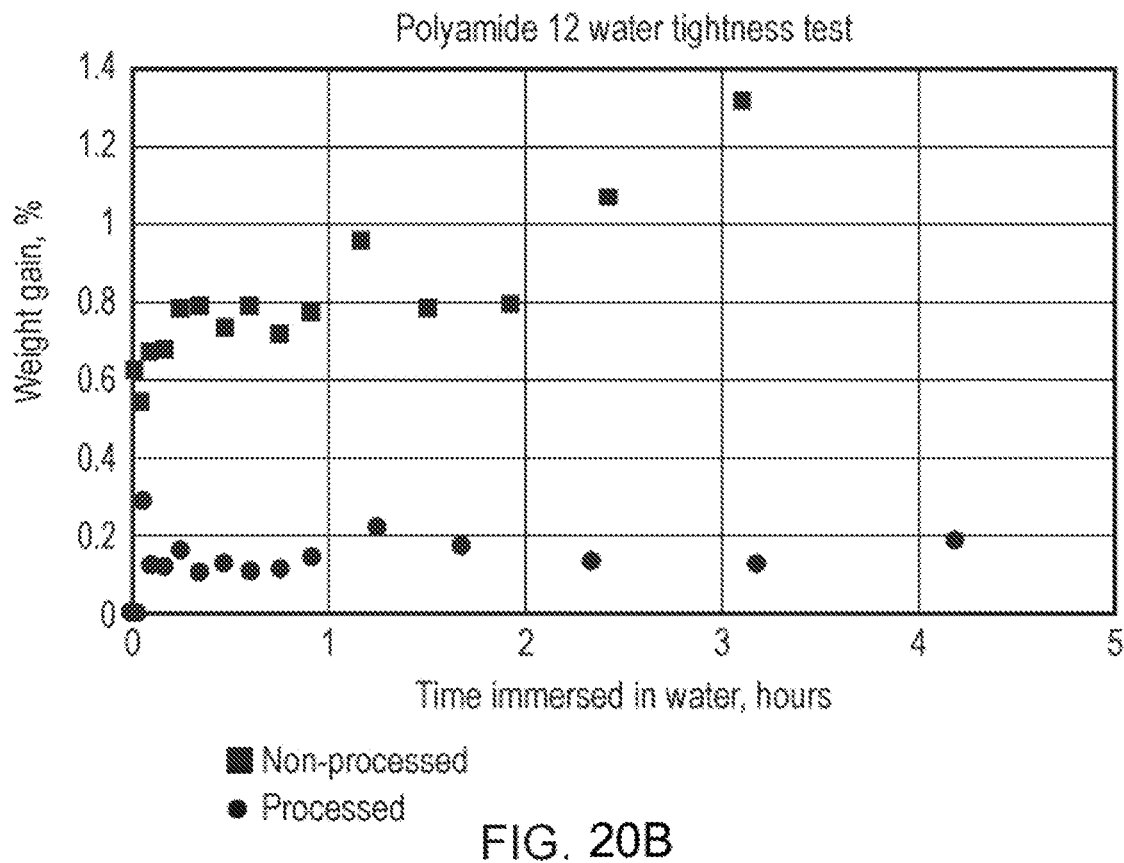
Figure 21:
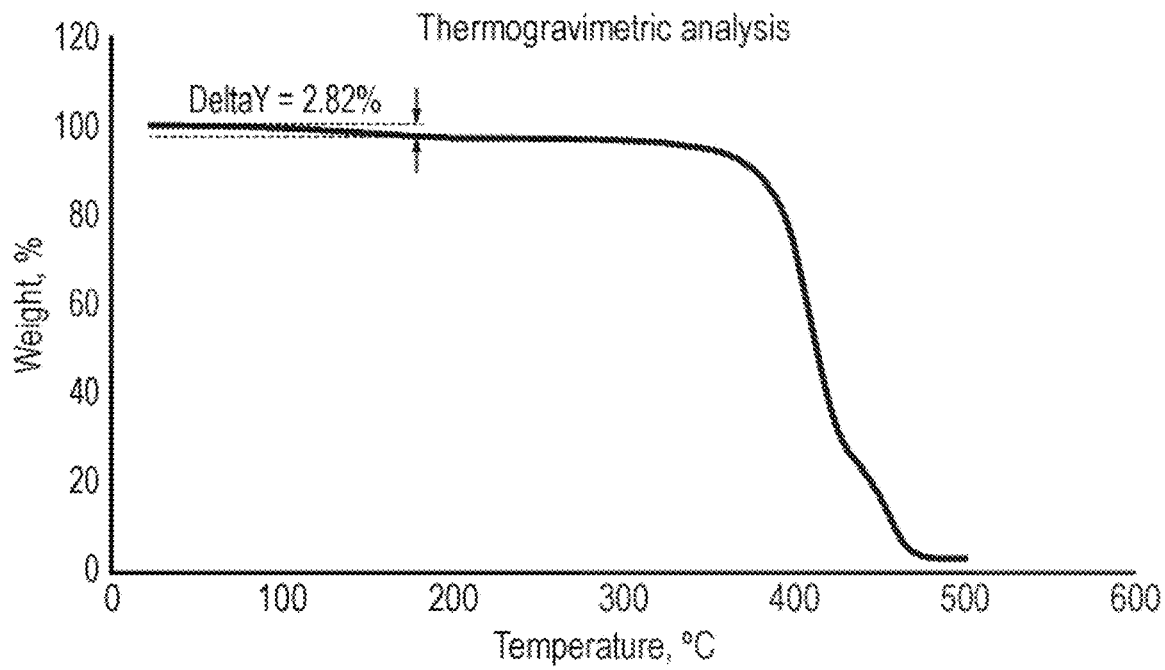
FIG. 21 illustrates thermogravimetric test results of a processed polymer in accordance with certain embodiments of the present invention.

The processing method according to the present invention may desirably seal the surface of porous materials, such as TPU and Polyamide 12, which might be advantageous where the AM part is to be used in water-sealing applications or where water tightness of the material is particularly important (see FIGS. 20A-B). This particle surface sealing effect may in turn have further applications in water-sealing applications. The processing method according to the present invention may also desirably improve the tensile strength of the AM polymer part/s. The control of the drying step of the processing method according to certain embodiments of the present invention desirably avoids continued processing of an AM part which would otherwise occur due to the presence of unevaporated solvent on the part's surface. Use of the pre-packaged and interchangeable solvent reservoirs/cartridges eliminates the need to handle solvents in a fume cupboard for example. A closed loop system as described above allows recovery of solvents used to enable total solvent consumption from the cartridge to be minimised thus reducing the operation costs and environmental impact in terms of solvent creation and disposal etc.

Whilst the apparatus and method according to certain embodiments of the present invention have been described herein with reference to a 'static' processing chamber, the invention could be implemented as part of a 'dynamic' conveyor-like system which move AM parts through a 3D printing device and automated inspection/monitoring system.

The applications for the apparatus and method according to certain embodiments of the present invention are wide ranging, and may be suitable for processing any AM part which requires a desired finish for aesthetic and/or functional purposes, such as footwear, automotive interior/trim components, and dental/medical devices, or the like.

The invention claimed is:

1. A method of smoothing a surface of an upper layer of an additively manufactured polymer part, the method comprising the steps of:
    locating an additively manufactured polymer part in a processing chamber, said part having an upper layer with a surface in a first state;
    transferring a dose of solvent from a reservoir containing a liquid solvent to a dosing chamber, said dosing chamber being provided separately from the reservoir and from the processing chamber;
    creating a vaporised solvent by heating the dose of solvent so as to cause the dose of solvent to vaporise;
    applying a negative pressure to an interior of the processing chamber, wherein the negative pressure applied to the interior of the processing chamber is controlled so as to maintain the solvent in a vaporised state upon delivery into the processing chamber;
    delivering the vaporised solvent into the processing chamber;
    creating a condensate on the surface of the additively manufactured polymer part from the vaporised solvent; and
    using the condensate to dissolve at least a portion of the upper layer of the additively manufactured polymer part to bring said surface of the upper layer into a second state, wherein the second state is smoother than the first state,
    wherein:
        the quantity of solvent transferred from the reservoir to the dosing chamber is controlled based on at least one parameter associated with the additively manufactured polymer part;
        the condensate is maintained on the surface of the additively manufactured polymer part for an exposure time in the range of 5 seconds to 120 minutes; and
        once the exposure time has been reached, the method further comprises the step of re-applying a negative pressure to the interior of the processing chamber so as to return the condensate to a vaporized state.

2. The method according to claim 1, wherein the step of locating the additively manufactured polymer part within the processing chamber comprises suspending the additively manufactured polymer part from a rack, hook or frame.

3. The method according to claim 1, wherein the negative pressure applied to the interior of the processing chamber once the exposure time has been reached is between 10 and 200 mbar.

4. The method according to claim 1, wherein the negative pressure applied to the interior of the processing chamber is between 10 and 400 mbar.

5. The method according to claim 1, wherein the condensate is created by increasing the pressure within the interior of the processing chamber, and optionally wherein the condensate is created by introducing ambient air, one or more inert gasses or additional vaporized solvent into the interior of the processing chamber.

6. The method according to claim 1, wherein the negative pressure applied to the interior of the processing chamber is used to deliver the vaporized solvent into the processing chamber.

7. The method according to claim 1, wherein the method further comprises recovering the solvent from the processing chamber and returning the recovered solvent to a solvent reservoir.

8. The method according to claim 1, wherein the method is an automated method further comprising:
    inputting or selecting at least one parameter associated with the additively manufactured polymer part via a controller having a user interface;
    determining a processing programme for processing the additively manufactured polymer part based on the at least one parameter input or selected via the user interface, wherein the steps of transferring the dose of solvent from the reservoir to the dosing chamber, creating a vaporised solvent by heating the dose of solvent so as to cause the solvent to vaporise, applying a negative pressure to an interior of the processing chamber to maintain the solvent in a vaporised state upon delivery into the processing chamber, delivering the vaporised solvent into the processing chamber, creating a condensate on the surface of the additively manufactured polymer part from the vaporised solvent and using the condensate to dissolve at least a portion of the upper layer of the additively manufactured polymer part are controlled based on the processing programme; and
    executing, via the controller, said processing programme so as to smooth the surface of the additively manufactured polymer part.

9. The method according to claim 1, wherein the at least one parameter is a material of the part, a desired surface roughness of the part, a geometric property of the part and/or a complexity of the part.

10. The method according to claim 1, wherein the at least one parameter is a material of the part.

11. The method according to claim 8, wherein the condensate is maintained on the surface of the additively manufactured polymer part for an exposure time in the range of 5 seconds to 120 minutes;
   wherein the exposure time is determined automatically by the controller based on the at least one parameter of the additively manufactured polymer part input or selected via the user interface, and, optionally;
   wherein the controller automatically controls a vacuum pump to re-apply a negative pressure to the interior of the processing chamber once the determined exposure time has been reached.

12. The method according to claim 11, wherein the method further comprises:
   storing a set of algorithms within the controller, said algorithms defining the relationships between parameters associated with the additively manufactured polymer part and a surface finish to be achieved via the method; and
   calculating the exposure time using at least one of the algorithms stored within the controller and the at least one parameter input or selected via the user interface.

13. The method according to claim 8, further comprising:
   inputting a digital CAD file of the additively manufactured polymer part into the controller, and
   controlling the amount of solvent delivered into the processing chamber based on a geometry of the additively manufactured polymer part acquired from the CAD file.

14. The method according to claim 8, wherein the controller logs data relating to an amount of solvent and/or an exposure time used for processing the additively manufactured polymer part and uploads said data to a database for storage.

15. The method according to claim 1, wherein the solvent comprises a protonic polar solvent or a non-proton polar solvent.

16. The method according to claim 1, wherein the solvent comprises at least one of 1,1,1,3,3,3-hexafluoro-2-propanol (HFIP), dimethylformamide, sulphuric acid, m-cresol, formic acid, trifluoroacetic acid or benzyl alcohol.

17. The method according to claim 1, wherein the solvent comprises benzyl alcohol.

18. The method according to claim 1, wherein the additively manufactured polymer part comprises at least one of Nylon materials, Thermoplastic Polyurethane (TPU), ABS or TPE-210 elastomer materials.

19. The method according to claim 1, wherein the method is an automated method which is controlled via machine learning.

* * * * *

UNITED STATES PATENT AND TRADEMARK OFFICE
CERTIFICATE OF CORRECTION

| | | |
|---|---|---|
| PATENT NO. | : 12,162,220 B2 | Page 1 of 1 |
| APPLICATION NO. | : 17/895381 | |
| DATED | : December 10, 2024 | |
| INVENTOR(S) | : Joseph Gwilliam Crabtree et al. | |

It is certified that error appears in the above-identified patent and that said Letters Patent is hereby corrected as shown below:

On the Title Page

Item (57), ABSTRACT, Line 5, delete "reservoir," and insert -- reservoir; --, therefor.

Signed and Sealed this
Sixth Day of May, 2025

Coke Morgan Stewart
*Acting Director of the United States Patent and Trademark Office*